United States Patent
Voskian et al.

(10) Patent No.: US 11,931,692 B2
(45) Date of Patent: Mar. 19, 2024

(54) METHOD FOR ELECTROCHEMICAL GAS SEPARATION

(71) Applicant: Verdox, Inc, Woburn, MA (US)

(72) Inventors: Sahag Voskian, Boston, MA (US); Alexander Reath, Melrose, MA (US); Cameron Rogers, Malden, MA (US); Alexander Murray, Arlington, MA (US); Seokjoon Oh, Malden, MA (US)

(73) Assignee: VERDOX, INC, Woburn, MA (US)

( * ) Notice: Subject to any disclaimer, the term of this patent is extended or adjusted under 35 U.S.C. 154(b) by 166 days.

(21) Appl. No.: 17/665,815

(22) Filed: Feb. 7, 2022

(65) Prior Publication Data

US 2022/0339579 A1   Oct. 27, 2022

Related U.S. Application Data

(60) Provisional application No. 63/171,762, filed on Apr. 7, 2021.

(51) Int. Cl.
*B01D 53/32* (2006.01)

(52) U.S. Cl.
CPC .............................. *B01D 53/326* (2013.01)

(58) Field of Classification Search
CPC ................................................. B01D 53/326
USPC ....................................................... 205/763
See application file for complete search history.

(56) References Cited

U.S. PATENT DOCUMENTS

| | | | |
|---|---|---|---|
| 10,464,018 | B2 | 11/2019 | Voskian et al. |
| 10,744,457 | B2 | 8/2020 | Perry |
| 11,219,858 | B2 | 1/2022 | Voskian et al. |
| 11,298,653 | B2 | 4/2022 | Voskian et al. |
| 2006/0081482 | A1 | 4/2006 | Tempel et al. |
| 2007/0287812 | A1 | 12/2007 | McDermott et al. |
| 2008/0083606 | A1 | 4/2008 | Volland et al. |
| 2018/0028962 | A1 | 2/2018 | Hatton et al. |
| 2021/0060484 | A1 | 3/2021 | Aziz et al. |
| 2021/0060485 | A1 | 3/2021 | Voskian et al. |

(Continued)

FOREIGN PATENT DOCUMENTS

WO    2021041732 A1    3/2021

OTHER PUBLICATIONS

Written Opinion for the corresponding International Application No. PCT/US2022/015438; International Filing Date: Feb. 7, 2022; dated Apr. 18, 2022; 9 pages.

(Continued)

*Primary Examiner* — Anita Nassiri-Motlagh
(74) *Attorney, Agent, or Firm* — CANTOR COLBURN LLP

(57) ABSTRACT

A method for separating a Lewis acid gas from a fluid mixture, comprising contacting the fluid mixture with a reduced electroactive species; a non-aqueous electrolyte; and a stabilizing additive to form an anion adduct between the Lewis acid gas and the reduced electroactive species, wherein the electroactive species comprises an oxidized state, and at least one reduced state that bonds with the Lewis acid gas to form the anion adduct, wherein the stabilizing additive comprises a cationic Lewis acid, a hydrogen-bond donor, or a combination thereof, and the stabilizing additive is present in an effective amount to kinetically favor the forming of the anion adduct from the reduced electroactive species and thermodynamically favor the forming of the anion adduct in the thermodynamic equilibrium between the anion adduct and the reduced electroactive species.

31 Claims, 12 Drawing Sheets

(56) References Cited

U.S. PATENT DOCUMENTS

| | | |
|---|---|---|
| 2021/0062351 A1 | 3/2021 | Voskian et al. |
| 2021/0387139 A1 | 12/2021 | Voskian et al. |
| 2022/0040632 A1 | 2/2022 | Voskian et al. |
| 2022/0184552 A1 | 6/2022 | Voskian et al. |

OTHER PUBLICATIONS

International Search Report for the corresponding International Application No. PCT/US2022/015438; International Filing Date: Feb. 7, 2022; dated Apr. 18, 2022; 2 pages.

Azcarate, I. et al., "Through-Space Charge Interaction Substituent Effects in Molecular Catalysis Leading to the Design of the Most Efficient Catalyst of CO2-to-CO Electrochemical Conversion," J. Am. Chem. Soc., vol. 138, 2016; pp. 16639-16644.

Chabolla, S. A. et al., "For CO2 Reduction, Hydrogen-Bond Donors Do the Trick," ACS Central Science, vol. 4, 2018; pp. 315-317.

Dey, S. et al., "Activation of Co(I) State in a Cobalt-Dithiolato Catalyst for Selective and Efficient CO2 Reduction to CO," Inorganic Chemistry, vol. 57, 2018; pp. 5939-5947.

Dubois, D. L. et al., "Electrochemical Concentration of Carbon Dioxide," Solar Energy Research Institute, Chapter 4; pp. 94-117.

Fachinetti et al., "Bifunctional Activation of Carbon Dioxide. Synthesis and Structure of a Reversible COz Carrier," Journal of the American Chemical Society, 100:23, 1978; pp. 7405-7407.

Fachinetti, G. et al., "Bifunctional Model Complexes Active in Carbon Dioxide Fixation: Synthesis and X-ray Structure of Bimetallic Cobalt(I)-Alkali Cation-Schiff Base Complexes," Inorganic Chemistry, vol. 18, No. 12, 1979; pp. 3469-3475.

Floriani, C. et al., "Sodium [NN'-Ethylenebis(salicylideneiminato)cobaltate(I)], a Reversible Carbon Dioxide Carrier," J.C.S. Chem. Comm., 1974; pp. 615-616.

Gurkan, B. et al., "Quinone Reduction in Ionic Liquids for Electrochemical CO2 Separation," ACS Sustainable Chem. Eng., vol. 3, 2015; pp. 1394-1405.

Liu et al., "Electrochemically mediated carbon dioxide separation with quinone chemistry in salt-concentrated aqueous media," Supplementary Information; 27 pages.

Liu, Y. et al., "Electrochemically mediated carbon dioxide separation with quinone chemistry in salt-concentrated aqueous media," Nature Communications, 11:2278, 2020; pp. 1-11.

Mizen, M. B. et al., "Reductive Addition of CO2 to 9,10-Phenanthrenequinone," Journal of the Electrochemical Society, vol. 136, No. 4, 1989; 7 pages.

Scovazzo, P. et al., "Electrochemical Separation and Concentration of <1% Carbon Dioxide from Nitrogen," Journal of the Electrochemical Society, vol. 150, No. 5, 2003; 9 pages.

Staley, P. A., "The Electrochemistry of Quinones in Aprotic Solvents," UC San Diego Electronic Theses and Disseratitions, Date of Publication: 2016; 185 pages.

Voskian, S. et al., "Faradaic electro-swing reactive adsorption for CO2 capture," Energy Environ. Sco., vol. 12, 2019; 18 pages.

Yin, W. et al., "Electrochemical Reduction of CO 2 Mediated by Quinone Derivatives: Implication for Li—CO 2 Battery," Journal of Physical Chemistry C, American Chemical Society, vol. 122, No. 12, 2018; pp. 6546-6554.

METHOD FOR ELECTROCHEMICAL GAS SEPARATION

CROSS-REFERENCE TO RELATED APPLICATION

This application claims priority to U.S. Provisional Patent Application No. 63/171,762, filed on Apr. 7, 2021, in the United States Patent and Trademark Office, and all the benefits accruing therefrom under 35 U.S.C. § 119, the content of which is incorporated herein in its entirety by reference.

FEDERAL RESEARCH STATEMENT

This invention was made with government support under award number DE-SC0020915 awarded by the Office of Science SC-1, U.S. Department of Energy. The government has certain rights in the invention.

BACKGROUND

Removing target species from fluid mixtures has been the subject of much research and development. For example, there have been efforts to mitigate global warming by curbing carbon dioxide emissions. To this end, a number of approaches have been explored, including thermal methods, to capture carbon dioxide at different stages of its production. Other potential applications of Lewis acid gas removal include removing Lewis acid gases directly from air or ventilated air.

Electroswing adsorption is an alternative method of capturing a Lewis acid gas from a gaseous mixture. In an electroswing adsorption cell, the electrode includes an electrically conductive scaffold, such as carbon fiber paper, which serves several functions including providing a conduction path for electrons, a surface area for an active material to interface with the electrolyte, and mechanical support to maintain a porous structure.

There remains a continuing need for improved materials and methods for capturing a target species from a fluid mixture. It would be particularly advantageous to provide a method for capturing a Lewis acid gas using an electroswing adsorption cell with a thinner electrode.

SUMMARY

Provided is a method for separating a Lewis acid gas from a fluid mixture comprising the Lewis acid gas, the method comprising contacting the fluid mixture with: an electroactive species in a reduced state; a non-aqueous electrolyte; and a stabilizing additive, to form an anion adduct between the Lewis acid gas and the electroactive species in the reduced state, wherein the electroactive species comprises: an oxidized state, and at least one reduced state wherein the electroactive species bonds with the Lewis acid gas to form the anion adduct, wherein the stabilizing additive comprises a cationic Lewis acid, a hydrogen-bond donor, or a combination thereof, and wherein the stabilizing additive is present in an effective amount to kinetically favor the forming of the anion adduct from the reduced electroactive species and the Lewis acid gas, thermodynamically favor the forming of the anion adduct in a thermodynamic equilibrium between the anion adduct and the reduced electroactive species, or kinetically favor the forming of the anion adduct from the reduced electroactive species and thermodynamically favor the forming of the anion adduct in the thermodynamic equilibrium between the anion adduct and the reduced electroactive species.

Also provided is an electrochemical apparatus comprising: a chamber comprising a negative electrode in electronic communication with an electroactive species in a reduced state, a non-aqueous electrolyte, and a stabilizing additive, wherein the chamber is configured to receive a fluid mixture comprising a Lewis acid gas, wherein the electroactive species comprises: an oxidized state, and at least one reduced state wherein the electroactive species bonds with the Lewis acid gas to form an anion adduct, wherein the stabilizing additive comprises a cationic Lewis acid, a hydrogen-bond donor, or a combination thereof, and wherein the stabilizing additive is present in an effective amount to: kinetically favor the forming of an anion adduct between the Lewis acid gas and the reduced electroactive species, thermodynamically favor the forming of the anion adduct in a thermodynamic equilibrium between the anion adduct and the reduced electroactive species, or kinetically favor the forming of the anion adduct between the Lewis acid gas and the reduced electroactive species and thermodynamically favor the forming of the anion adduct in the thermodynamic equilibrium between the anion adduct and the reduced electroactive species.

Further provided is a gas separation system, comprising a plurality of electrochemical cells in fluid communication with a gas inlet and a gas outlet, wherein each of the plurality of electrochemical cells comprises: a first electrode comprising an electroactive species in a reduced state, wherein the electroactive species comprises an oxidized state and at least one reduced state which bonds with the Lewis acid gas to form the anion adduct; a second electrode comprising a complementary electroactive layer; a first separator between the first electrode and the second electrode; a non-aqueous electrolyte; and a stabilizing additive, wherein the stabilizing additive comprises a cationic Lewis acid, a hydrogen-bond donor, or a combination thereof, wherein the stabilizing additive is present in an effective amount to: kinetically favor the forming of the anion adduct from the reduced electroactive species and the Lewis acid gas, thermodynamically favor the forming of the anion adduct in a thermodynamic equilibrium between the anion adduct and the reduced electroactive species, or kinetically favor the forming of the anion adduct from the reduced electroactive species and thermodynamically favor the forming of the anion adduct in the thermodynamic equilibrium between the anion adduct and the reduced electroactive species.

The above described and other features are exemplified by the following figures and detailed description.

BRIEF DESCRIPTION OF THE DRAWINGS

The following figures are exemplary embodiments wherein the like elements are numbered alike. In the figures "E" is used to represent "exponent," e.g., 1E-05 means $1 \times 10^{-5}$.

DETAILED DESCRIPTION

Figure 1:
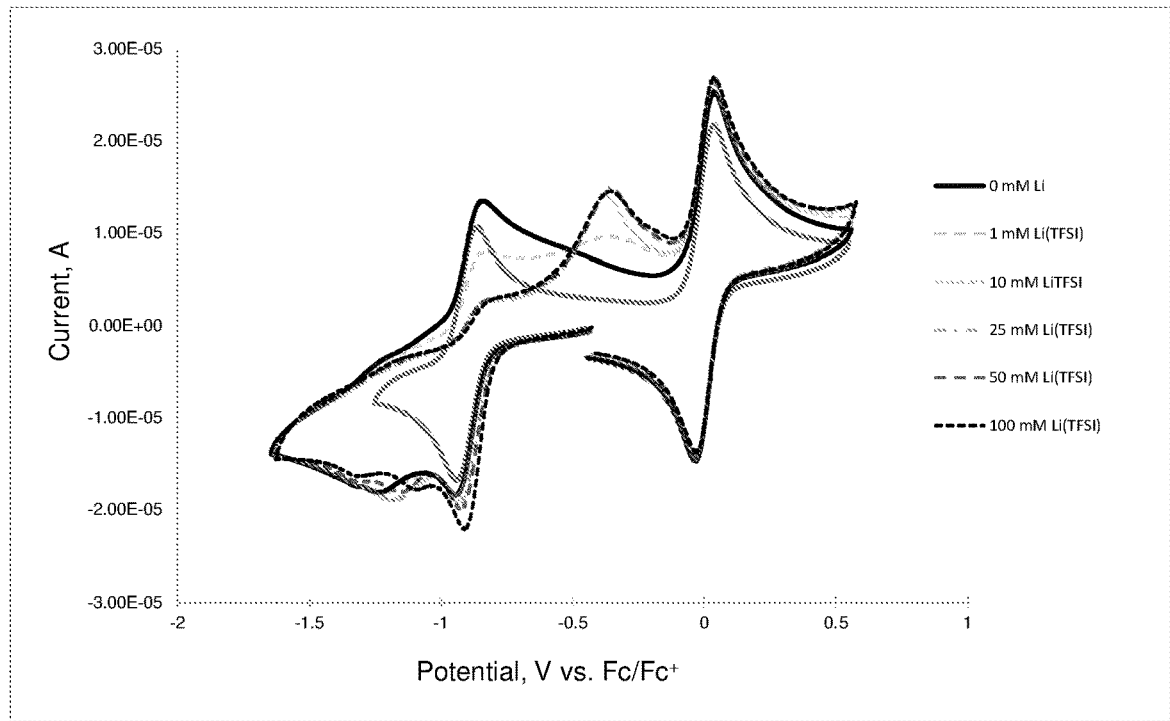
FIG. 1 is a graph of current (Amperes, A) versus potential (Volts, V); vs. ferrocene ($Fc/Fc^+$) and shows overlaid cyclic voltammograms as described in Example 1.

The present disclosure describes in further detailed exemplary embodiments directed to a method, an apparatus, and a system for the separation of one or more Lewis acid gases from a fluid mixture. The exemplary embodiments described herein can be used for capturing a Lewis acid gas (e.g., $CO_2$) by an electrochemical process from a fluid mixture by contacting the fluid mixture with an electroactive species in a reduced state ("reduced electroactive species") and a non-aqueous electrolyte in the presence of a stabilizing additive. Advantageously, the stabilizing additive may be present in an amount that is effective ("an effective amount") to kinetically favor the formation of an anion adduct that may be formed between the Lewis acid gas and a reduced electroactive species and/or to thermodynamically favor the formation of an anion adduct that may be formed between the Lewis acid gas and a reduced electroactive species.

Provided is a method for separating a Lewis acid gas from a fluid mixture including the Lewis acid gas. The method includes contacting the fluid mixture with an electroactive species in a reduced state and a non-aqueous electrolyte in the presence of a stabilizing additive to form an anion adduct between the Lewis acid gas and the reduced electroactive species. As used herein, an "electroactive species" refers to a material that undergoes oxidation or reduction upon exposure to an electrical potential in an electrochemical cell. The electroactive species is capable of bonding with or binding to a Lewis acid gas when the electroactive species is in a reduced state and releasing the Lewis acid gas when the electroactive species is in an oxidized state. Accordingly, the electroactive species includes an oxidized state and at least one reduced state, and a reduced electroactive species bonds with the Lewis acid gas to form an anion adduct. As used herein, "an anion adduct" refers to a reduced electroactive species that is bonded with a Lewis acid gas. Subsequent oxidation of the electroactive species may release the Lewis acid gas, and the corresponding method may provide for reversible capture of the Lewis acid gas, such as for reversible carbon capture in the case of $CO_2$.

In some aspects, an association constant between the reduced electroactive species and the Lewis acid gas in the presence of the effective amount of the stabilizing additive is greater than an association constant between the reduced electroactive species and the Lewis acid gas in the absence of the effective amount of the stabilizing additive.

In some aspects, the forming of the anion adduct from the reduced electroactive species and the Lewis acid gas in the presence of the effective amount of the stabilizing additive is kinetically more favorable than forming of the anion adduct from the reduced electroactive species and the Lewis acid gas in the absence of the effective amount of the stabilizing additive.

The fluid mixture includes a Lewis acid gas. The term "Lewis acid gas" refers to a gaseous species able to accept an electron pair from an electron pair donor (e.g., by having an empty orbital energetically accessible to the electron pair of the donor).

The Lewis acid gas can include carbon dioxide ($CO_2$), carbonyl sulfide (COS), a sulfur oxide such as sulfur dioxide ($SO_2$) or sulfur trioxide ($SO_3$); an organosulfate ($R_2SO_4$) such as dimethyl sulfate; a nitrogen oxide such as nitrogen dioxide ($NO_2$) or nitrogen trioxide ($NO_3$); a phosphate ester ($R_3PO_4$) such as trimethyl phosphate; a sulfide ($R_2S$), an ester (RCOOR') such as methyl formate or methyl acrylate; an aldehyde (RCHO) such as formaldehyde or acrolein; a ketone ($R'_2CO$) such as acetone, an isocyanate (R'NCO) such as methyl isocyanate; an isothiocyanate (R'NCS); a borane ($BR''_3$) such as trimethyl borane, a borate ($R''_3BO_3$) such as trimethyl borate; or a combination thereof, each R is independently hydrogen, $C_{1-12}$ alkyl, $C_{3-12}$ cycloalkyl, $C_{1-12}$ heterocycloalkyl, $C_{6-20}$ aryl, or $C_{1-12}$ heteroaryl; each R' is independently $C_{1-12}$ alkyl, $C_{3-12}$ cycloalkyl, $C_{1-12}$ heterocycloalkyl, $C_{6-20}$ aryl, or $C_{1-12}$ heteroaryl; each R" is independently hydrogen, halogen, $C_{1-12}$ alkyl, $C_{3-12}$ cycloalkyl, $C_{1-12}$ heterocycloalkyl, $C_{6-20}$ aryl, or $C_{1-12}$ heteroaryl. In one or more aspects, the Lewis acid gas can include $CO_2$, COS, $SO_2$, $SO_3$, $NO_2$, or $NO_3$. In still other aspects, the Lewis acid gas is $CO_2$.

The electroactive species may be chosen so that at least one reduced state of the electroactive species has a strong affinity for the Lewis acid gas. In an aspect, in a reduced state, the electroactive species can have a binding constant with the Lewis acid gas of at least 10 liters/mole ($M^{-1}$), or at least $10^2$ $M^{-1}$, or at least $10^3$ $M^{-1}$ at room temperature (e.g., 23° C.). For example, the reduced electroactive species may have a binding constant with the Lewis acid gas that is 10 to $10^{20}$ $M^{-1}$, $10^3$ to $10^{19}$ $M^{-1}$, $10^4$ to $10^{18}$ $M^{-1}$, $10^5$ to $10^{17}$ $M^{-1}$, $10^6$ to $10^{16}$ $M^{-1}$, or $10^7$ to $10^{15}$ $M^{-1}$. In an aspect, the binding constant with the Lewis acid gas is $10^5$ to $10^{20}$ $M^{-1}$, or $10^{10}$ to $10^{15}$ $M^{-1}$.

In an aspect, the electroactive species can have at least two oxidation states. When the electroactive species is in the first oxidation state, it can be considered to be in an "active state", wherein the affinity for the Lewis acid gas can be high (i.e., the electroactive species in the "active state" can have a binding constant with the Lewis acid gas). In the second oxidation state, the electroactive species can be considered to be in a "deactivated" state, wherein the affinity for the Lewis acid gas is reduced relative to the affinity for the Lewis acid gas of the "active" state. For example, the electroactive species can have a ratio of the binding constant in the deactivated state to the binding constant in the active state of 0.9:1 to $10^{-20}$:1, for example, 0.9:1, 0.8:1, 0.5:1, 0.1:1, $10^{-2}$:1, $10^{-3}$:1, $10^{-4}$:1, or $10^{-20}$:1. In an aspect, the binding constant with the Lewis acid gas in the deactivated state can be 0 (i.e., the deactivated state is essentially inactive towards the Lewis acid gas species).

The electroactive species can have at least one oxidation state wherein the Lewis acid gas can be released from the electroactive species. For example, in an aspect, the electroactive species can have at least one oxidized state, wherein upon oxidation to the oxidized state, the Lewis acid gas can be released from the electroactive species. In an aspect, the binding constant of the reduced electroactive species to the Lewis acid gas can be greater than the binding constant of the corresponding oxidized electroactive species to the Lewis acid gas. Accordingly, in an advantageous feature, capture and release of the Lewis acid gas can be achieved through redox cycling.

The electroactive species can be capable of binding the Lewis acid gas on a timescale on the order of minutes, on the order of seconds, on the order of milliseconds, or on the order of microseconds or less.

In an aspect, the electroactive species can have a reduced state in which the electroactive species is capable of bonding with the Lewis acid gas, and there is at least one temperature (e.g., in a range of greater than or equal to 223 K, greater than or equal to 248 K, greater than or equal to 273 K, or greater than or equal to 298 K, and up to 323 K, up to 348 K, or up to 413 K, for example 298 K) at which it is thermodynamically unfavorable for the reduced electroactive species to react with dioxygen ($O_2$). In an aspect, the electroactive species can have a reduced state in which the electroactive species is capable of bonding with the Lewis acid gas, and there is at least one temperature (e.g., 298 K) at which it is kinetically unfavorable for the reduced electroactive species to react with dioxygen ($O_2$) because, e.g., a rate constant for the reaction with oxygen is too slow for a reaction to occur on a timescale commensurate with capture of the Lewis acid gas. Accordingly, the electroactive species provides specificity towards capture of the Lewis acid gas over dioxygen.

The electroactive species can comprise an electroactive polymer, an electroactive oligomer, an electroactive organic compound, an electroactive material (e.g. a functionalized carbon nanotube or the like), or a combination thereof. The electroactive species can include at least one functional group capable of binding to a Lewis acid gas, for example a carbonyl group.

Exemplary electroactive organic compounds can include, but are not limited to, substituted or unsubstituted quinones or tetrones, bipyridines, phenazines, bipyridiniums or viologens, pyraziniums, pyrimidiniums, quinoxaliniums, pyryliums, pyridiniums, tetrazoliums, verdazyls, alloxazines, isoalloxazines, quinodimethanes, tricyanovinylbenzenes, tetracyanoethylene, thioketones, thioquinones, and disulfides. In an aspect, the electroactive species includes a substituted or unsubstituted quinone (e.g., the quinone can include one or more functional groups or other moieties or linkages bound to the quinone). The choice of substituent (e.g., functional group) on the substituted quinone can depend on a variety of factors, including but not limited to its effect on the reduction potential of the substituted quinone. One of ordinary skill, with the benefit of this disclosure, would understand how to determine which substituents or combinations of substituents on the substituted quinone are suitable for the first electroactive species based on, for example, synthetic feasibility and resulting reduction potential. Exemplary functional groups can include, but are not limited to, halo (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl or ethyl ester), amino, amido, quaternary ammonium (e.g., tetraalkylamino), branched or unbranched alkyl (e.g., $C_{1-18}$ alkyl), heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, or carbonyl groups, any of which can be substituted or unsubstituted. Any suitable organic or inorganic counterion can be present in the foregoing charged species, for example an alkali metal, alkaline earth metal, ammonium, or a substituted ammonium of the formula $R_4N^+$ wherein each R is the same or different, and is independently a $C_{1-18}$ hydrocarbyl, provided that that least one R is hydrocarbyl.

In an aspect, the electroactive species includes a substituted or unsubstituted quinone of structure (I) or (II):

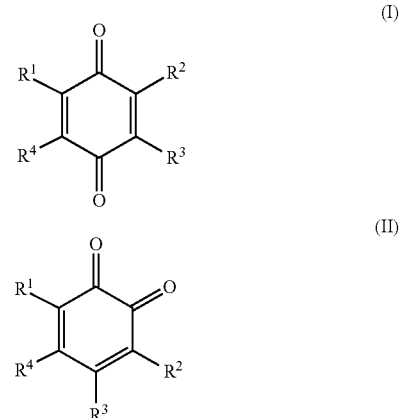

wherein $R^1$, $R^2$, $R^3$, and $R^4$ are independently at each occurrence hydrogen, halogen (e.g., chloro, bromo, iodo), hydroxyl, carboxylate/carboxylic acid, sulfonate/sulfonic acid, alkylsulfonate/alkylsulfonic acid, phosphonate and/or phosphonic acid, alkylphosphonate and/or alkylphosphonic acid, acyl (e.g., acetyl or ethyl ester), amino, amido, quaternary ammonium (e.g., tetraalkylamino), branched or unbranched $C_{1-18}$ alkyl, heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, or carbonyl groups, any of which can be substituted or unsubstituted, and any two adjacent groups $R^1$ to $R^4$ can optionally form a cyclic group together.

In some aspects, the electroactive species can include a substituted or unsubstituted quinone or tetrone, preferably 1,4-benzoquinone, 1,2-benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or a combination thereof. Any of the foregoing can optionally be substituted as described above. In an aspect, the electroactive species may include an optionally substituted naphthoquinone, an optionally substituted quinoline, an optionally substituted anthraquinone, an optionally substituted phenanthrenequinone (also referred to as an optionally substituted phenanthrenedione), or an optionally substituted thiochromene-dione. For example, the electroactive species may include benzo[g]quinoline-5,10-dione, benzo[g]isoquinoline-5,10-dione, benzo[g]quinoxaline-5,10-dione, quinoline-5,8-dione, or 1-lambda$^4$-thiochromene-5,8-dione. Other regioisomers of the foregoing non-limiting exemplary electroactive species may also be used (e.g., with substituents at different positions of the quinone).

In some aspects, the electroactive species can include a substituted or unsubstituted bipyridine, a substituted or unsubstituted phenazine, a substituted or unsubstituted bipyridinium, a substituted or unsubstituted viologen, a substituted or unsubstituted pyrazinium, a substituted or unsubstituted pyrimidinium, a substituted or unsubstituted quinoxalinium, a substituted or unsubstituted pyrylium, a substituted or unsubstituted pyridinium, a substituted or unsubstituted tetrazolium, a substituted or unsubstituted verdazyl, a substituted or unsubstituted alloxazine, a substituted or unsubstituted isoalloxazine, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquionone, a substituted or unsubstituted disulfide, or a combination thereof.

In an aspect, the electroactive species is an electroactive polymer or oligomer. As used herein, the term "polymer" refers to structures having greater than 10 repeating units. As used herein, the term "oligomer" refers to structures having 2 to 10 repeating units. In an aspect, at least a portion of the electroactive polymer includes a polymer backbone wherein at least one of the electroactive species is covalently bound to the polymer backbone. In an aspect, the electroactive species may form at least a portion of the polymer backbone.

In an aspect, the electroactive species includes a polymer or oligomer comprising a repeating unit derived from a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted alloxazine, a substituted or unsubstituted isoalloxazine, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquionone, a substituted or unsubstituted disulfide, or a combination thereof.

Exemplary electroactive species include a polymer or oligomer that includes one or more repeating units derived from a substituted or unsubstituted 1,4-benzoquinone, a substituted or unsubstituted 1,2-benzoquinone, a substituted or unsubstituted 1,4-naphthoquinone, a substituted or unsubstituted 1,2-naphthoquinone, a substituted or unsubstituted 2,3-diaminonaphthalene, a substituted or unsubstituted anthraquinone, a substituted or unsubstituted phenanthrenequinone, a substituted or unsubstituted benzanthraquinone, a substituted or unsubstituted dibenzoanthraquinone, a substituted or unsubstituted 4,5,9,10-pyrenetetrone, a substituted or unsubstituted indole, a substituted or unsubstituted quinoline, a substituted or unsubstituted isoquinoline, a substituted or unsubstituted benzimidazole, or a substituted or unsubstituted benzotriazole.

In an aspect, the electroactive polymer includes repeating units derived from a quinone, which as described above can include 1,4-benzoquinone, 1,2-benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or a combination thereof. In an aspect, the electroactive polymer can include substituted or unsubstituted poly(anthraquinone). In an aspect, the electroactive polymer can comprise a substituted or unsubstituted poly(vinyl anthraquinone). In an aspect, the electroactive polymer can comprise a substituted or unsubstituted poly(phenylnaphthoquinone).

When the electroactive species includes the electroactive polymer or the electroactive oligomer, the electroactive polymer or the electroactive oligomer can optionally be crosslinked. Crosslinking can be accomplished by various methods generally known in the art. The skilled person, with the benefit of this disclosure, would be able to determine a suitable crosslinking chemistry based on the selection of the electroactive species.

For example, in some aspects, the electroactive species includes or is incorporated into hydrogels, ionogels, organogels, or combinations thereof. Such cross-linked polymeric materials are generally known in the art and may in some instances comprise electroactive species described herein as part of the three-dimensional structure (e.g., via covalent bonds). However, in some embodiments, electroactive species are incorporated into the cross-linked polymeric materials via adsorption (e.g., physisorption and/or chemisorption). In some aspects, the electroactive species includes an extended network. For example, the electroactive species may comprise a metal organic framework (MOF) or a covalent organic framework (COF). In some aspects, the electroactive species includes functionalized carbonaceous materials. For example, the electroactive species may include functionalized graphene, functionalized carbon nanotubes, functionalized carbon nanoribbons, edge-functionalized graphite, or combinations thereof.

The substituted or unsubstituted quinones of structure (I) and (II) are cyclic, conjugated systems having an even number of carbonyl groups that can be reduced in the manner shown below, with a one electron reduction to form a semiquinone anion (IA) or (IIA), respectively, and a subsequent one electron reduction of the semiquinone anion to form a quinone dianion (IB) or (IIB), respectively.

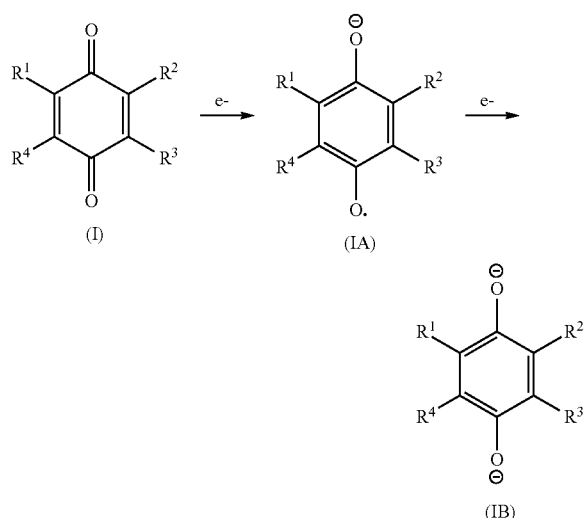

(I) (IA)

(IB)

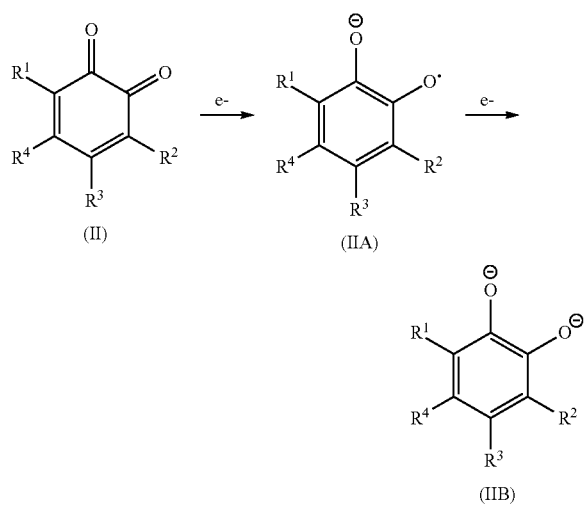

(II) (IIA)

(IIB)

When the electroactive species includes a quinone-containing compound and the Lewis acid gas is $CO_2$, an anion adduct $(Q\text{-}CO_2)^-$ may be formed between the semiquinone anion and $CO_2$, as shown below for the exemplary case of semiquinone anion (IA):

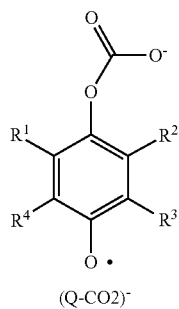

$(Q\text{-}CO2)^-$

When the electroactive species includes a quinone-containing compound and the Lewis acid gas is $CO_2$, an anion adduct $(Q\text{-}(CO_2)_2)^{2-}$ may be formed between the quinone dianion and $CO_2$, as shown below for the exemplary case of the quinone dianion (IB):

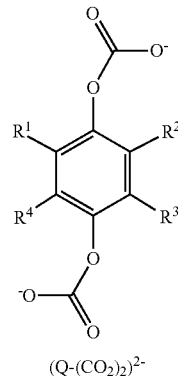

$(Q\text{-}(CO_2)_2)^{2-}$

In some aspects, the anion adduct formed between a quinone-containing compound and $CO_2$ includes an anion adduct $(Q\text{-}CO_2)^-$, an anion adduct $(Q\text{-}(CO_2)_2)^{2-}$, or a combination thereof.

The stabilizing additive includes a cationic Lewis acid, a hydrogen-bond donor, or a combination thereof. The stabilizing additive is present in an effective amount to kinetically favor the forming of the anion adduct from the reduced electroactive species and/or thermodynamically favor the forming of the anion adduct in the thermodynamic equilibrium between the anion adduct and the reduced electroactive species. For example, the stabilizing additive may be present in an amount of $10^{-3}$ to $10^1$ moles per liter ($M^1$). Within this range, the stabilizing additive may be present in an amount from $1\times10^{-3}$ to $5\times10^{-2}$, or from $5\times10^{-3}$ to $1\times10^{-1}$ $M^1$.

The stabilizing additive may be a cationic Lewis acid. As used herein, the term "cationic Lewis acid" refers to a cationic species that is able to accept electron density from an electron donor. The cationic Lewis acid may be present in an amount to kinetically favor the forming of the anion adduct from the reduced electroactive species and/or thermodynamically favor the forming of the anion adduct in the thermodynamic equilibrium between the anion adduct and the reduced electroactive species. For example, an association constant between the reduced electroactive species and the Lewis acid gas in the presence of the effective amount of the cationic Lewis acid is greater than an association constant between the reduced electroactive species and the Lewis acid gas in the absence of the effective amount of the cationic Lewis acid. For example, the forming of the anion adduct from the reduced electroactive species and the Lewis acid gas in the presence of the effective amount of the cationic Lewis acid is kinetically more favorable than forming of the anion adduct from the reduced electroactive species and the Lewis acid gas in the absence of the effective amount of the cationic Lewis acid.

In some aspects, the anion adduct between the reduced electroactive species and the Lewis acid gas is thermodynamically more stable than an adduct formed between the reduced electroactive species and the cationic Lewis acid. For example, the anion adduct between the semiquinone anion or the quinone dianion and the Lewis acid gas may be thermodynamically more stable than an adduct formed between the semiquinone anion or the quinone dianion and the cationic Lewis acid.

In some aspects, a reaction equilibrium constant between the reduced electroactive species and the Lewis acid gas in the presence of the cationic Lewis acid is greater than a reaction equilibrium constant between the reduced electroactive species and the Lewis acid gas in the absence of the cationic Lewis acid. For example, a reaction equilibrium constant between the semiquinone anion or the quinone dianion and the Lewis acid gas in the presence of the cationic Lewis acid may be greater than a reaction equilibrium constant between the semiquinone anion or the quinone dianion and the Lewis acid gas in the absence of the cationic Lewis acid.

In some aspects, an ionic bond strength between the cationic Lewis acid and the anion adduct is greater than an ionic bond strength between the reduced electroactive species and the cationic Lewis acid. For example, an ionic bond strength between the cationic Lewis acid and the anion adduct may be greater than an ionic bond strength between the semiquinone anion or the quinone dianion and the cationic Lewis acid.

In some aspects, an association constant between the cationic Lewis acid and the anion adduct is greater than an association constant between the semiquinone anion or the quinone dianion and the cationic Lewis acid. In particular aspects, an association constant between the semiquinone anion or the quinone dianion and the Lewis acid gas in the presence of the effective amount of the cationic Lewis acid is greater than an association constant between the semiquinone anion or the quinone dianion and the Lewis acid gas in the absence of the effective amount of the cationic Lewis acid.

The cationic Lewis acid may include a metal cation or a metalloid cation. In some aspects, the cationic Lewis acid may be a metal cation that is a Group 1 element, a Group 2 element, a rare earth element, a Group 11 element, a Group 12 element, a Group 13 element, or a combination thereof. For example, the metal cation may be Li, Na, K, Mg, Ca, Sc, La, Al, Zn, or a combination thereof. The cationic Lewis acid can be provided with an anion. The anion of the cationic Lewis acid can include, but is not limited to, one or more of halide, sulfate, sulfonate, carbonate, bicarbonate, phosphate, nitrate, nitrate, acetate, $PF_6$, $BF_4$, trifluoromethanesulfonate (triflate), nonaflate, bis(trifluoromethylsulfonyl)amide, bis(fluorosulfonyl)imide, trifluoroacetate, heptafluorobutanoate, haloaluminate, triazolide, dicyanamide, bis(pentafluoroethylsulfonyl)imide, thiocyanate, or an amino acid derivative (e.g., proline with the proton on the nitrogen removed).

The stabilizing additive may be a hydrogen-bond donor. As used herein, the term "hydrogen-bond donor" refers to a compound capable of being a hydrogen bond donor to a hydrogen bond acceptor. In the case of the anion adduct, which is a hydrogen bond acceptor, the hydrogen bond donor species stabilizes the anion adduct via hydrogen bonding. In some aspects, a hydrogen-bond strength between a hydrogen atom of the hydrogen-bond donor and the anion adduct is greater than a hydrogen-bond strength between the hydrogen atom of the hydrogen-bond donor and the semiquinone anion or the quinone dianion.

In some aspects, the forming of the anion adduct from the reduced electroactive species and the Lewis acid gas in the presence of the effective amount of the hydrogen bond donor kinetically favors the forming of the anion adduct from the reduced electroactive species and the Lewis acid gas in the absence of the effective amount of the hydrogen bond donor.

In some aspects, the stabilizing additive is the hydrogen-bond donor, and the anion adduct between the semiquinone anion or the quinone dianion and the Lewis acid gas is thermodynamically more stable than an adduct formed between the semiquinone anion or the quinone dianion and the hydrogen-bond donor In some aspects, the stabilizing additive is the hydrogen-bond donor, and a reaction equilibrium constant between the semiquinone anion or the quinone dianion and the Lewis acid gas in the presence of the hydrogen-bond donor is greater than a reaction equilibrium constant between the semiquinone anion or the quinone dianion and the Lewis acid gas in the absence of the hydrogen-bond donor.

In some aspects, the stabilizing additive is the hydrogen-bond donor, and an association constant between the hydrogen-bond donor and the anion adduct is greater than an association constant between the semiquinone anion or the quinone dianion and the hydrogen-bond donor.

In some aspects, the stabilizing additive is the hydrogen-bond donor, and an association constant between the semiquinone anion or the quinone dianion and the Lewis acid gas in the presence of the effective amount of the hydrogen bond donor is greater than an association constant between the semiquinone anion or the quinone dianion and the Lewis acid gas in the absence of the effective amount of the hydrogen bond donor.

In some aspects, the hydrogen bond donor is a compound that includes a hydroxyl group, an ammonium group, an anilinium group, a pyridinium group, an imidazolium group, a carboxylic acid group, a thiol group, a urea group, a guanidine group, a thiourea group, or a combination thereof. In an aspect, the hydrogen bond donor is a compound that includes a hydroxyl group, an ammonium group, an anilinium group, a pyridinium group, an imidazolium group, a carboxylic acid group, a thiol group, or a combination thereof. In an aspect, the hydrogen bond donor is a compound that includes a urea group, a guanidine group, a thiourea group, or a combination thereof.

In an aspect, the hydrogen bond donor is a compound that includes a hydroxyl group. Exemplary compounds that include a hydroxyl group can include, but are not limited to, $C_{1-18}$ alkyl alcohols, a $C_{6-20}$ aromatic alcohol, a hydroxyl-terminated poly- or oligo-($C_{1-6}$ alkylene) glycol (e.g., hydroxyl-terminated poly(ethylene glycol), a hydroxyl-diterminated poly(ethylene glycol), hydroxyl-terminated poly(propylene glycol), a hydroxyl-diterminated poly(propylene glycol), and the like, or a combination thereof), glycerin, and the like, or a combination thereof. In an aspect, the compound including a hydroxyl group can include a $C_{1-18}$ alkyl alcohol, for example, a $C_{1-6}$ alkyl alcohol (e.g., methanol, ethanol, propanol, t-butanol, i-butanol, and the like, or a combination thereof. In an aspect, the hydrogen bond donor can be water. In an aspect, the hydrogen bond donor may be an $C_{6-20}$ aromatic alcohol, for example a phenolic hydroxyl group (e.g., phenol). In some aspects, when the stabilizing additive includes the hydrogen bond donor and the non-aqueous electrolyte is an ionic liquid, the hydrogen bond donor does not include a cationic group that is the same as the cationic species of the ionic liquid.

In an aspect, the hydrogen bond donor can be a polymeric compound comprising one or more of a hydroxyl group, an ammonium group, an anilinium group, a pyridinium group, an imidazolium group, a carboxylic acid group, a thiol group, a urea group, a guanidine group, a thiourea group, or a combination thereof. For example, any of the foregoing hydrogen bond donor groups can be present in the form of a pendent group on the polymer chain, present as a backbone group within the polymer chain, present as a polymer chain end functional group, or a combination thereof. In an aspect, the hydrogen bond donor can be a polymeric compound comprising a hydroxyl group. Exemplary hydroxyl-containing polymers can include, but are not limited to, a poly(vinyl phenol), a poly(vinyl alcohol), and the like, or a combination thereof.

In an aspect, the stabilizing additive includes a combination of a cationic Lewis acid and a hydrogen-bond donor, wherein the cationic Lewis acid and the hydrogen-bond donor can be any of the foregoing.

The method is conducted in a non-aqueous electrolyte. The non-aqueous electrolyte may be a solid or a liquid having a suitable conductivity at room temperature (e.g., 23° C.). The non-aqueous electrolyte may be an organic electrolyte (e.g., N,N-dimethylformamide, liquid quinones), an ionic liquid, a liquid eutectic mixture of organic materials, a solvate ionic liquid, or a combination thereof. One example of liquid quinones that may be suitable for the methods and systems herein is a liquid mixture of benzoquinone and a second quinone such as a naphthoquinone as is described in Shimizu A, Takenaka K, Handa N, Nokami T, Itoh T, Yoshida J I. Liquid Quinones for Solvent-Free Redox Flow Batteries, *Advanced Materials.* 2017 November; 29(41): 1606592, the content of which is incorporated herein by reference in its entirety. In one or more aspects, a liquid mixture of benzoquinone and a second quinone such as a naphthoquinone can be used for both the electroactive species and the non-aqueous electrolyte. In some aspects, the non-aqueous electrolyte includes a carbonate ester. For example, in some aspects, the non-aqueous electrolyte may include dimethyl carbonate, diethyl carbonate, ethylmethyl carbonate, ethylene carbonate, propylene carbonate, or a combination thereof.

In an aspect, the organic electrolyte can include an organic solvent and a supporting electrolyte. Exemplary organic solvents include, but are not limited to, acetonitrile, dimethylformamide, propylene carbonate, dimethylsulfoxide, polyethylene glycol, diglyme, triethylene glycol dimethyl ether (trigylyme), tetraethylene glycol dimethyl ether (tetraglyme), pentaethylene glycol dimethyl ether (pentaglyme), 18-crown-6 ether, or a combination thereof. In an aspect, the organic solvent can include acetonitrile, dimethylformamide, propylene carbonate, dimethylsulfoxide, polyethylene glycol, diglyme, or a combination thereof. In an aspect, the solvent can include triethylene glycol dimethyl ether (trigylyme), tetraethylene glycol dimethyl ether (tetraglyme), pentaethylene glycol dimethyl ether (pentaglyme), 18-crown-6 ether, or a combination thereof.

The non-aqueous electrolyte can further include a supporting electrolyte, wherein the supporting electrolyte is different from the stabilizing additive. The supporting electrolyte is commonly a quaternary ammonium salt because of its electrical characteristics such as superior electric conductivity in a non-aqueous electrolyte and the like. Examples of the quaternary ammonium salt include, for example, $(CH_3)_4N \cdot BF_4$, $(CH_3)_3C_2H_5N \cdot BF_4$, $(CH_3)_2(C_2H_5)_2N \cdot BF_4$, $CH_3(C_2H_5)_3N \cdot BF_4$, $(C_2H_5)_4N \cdot BF_4$, $(C_3H_7)_4N \cdot BF_4$, $CH_3(C_4H_9)_3N \cdot BF_4$, $(C_4H_9)_4N \cdot BF_4$, $(C_6H_{13})_4N \cdot BF_4$, $(C_2H_5)_4N \cdot ClO_4$, $(C_2H_5)_4N \cdot BF_4$, $(C_2H_5)_4N \cdot PF_6$, $(C_2H_5)_4N \cdot AsF_6$, $(C_2H_5)_4N \cdot SbF_6$, $(C_2H_5)_4N \cdot CF_3SO_3$, $(C_2H_5)_4N \cdot C_4F_9SO_3$, $(C_2H_5)_4N \cdot (CF_3SO_2)_2N$, $(C_2H_5)_4N \cdot BCH_3(C_2H_5)_3$, $(C_2H_5)_4N \cdot B(C_2H_5)_4$, $(C_2H_5)_4N \cdot B(C_4H_9)_4$, $(C_2H_5)_4N \cdot B(C_6H_5)_4$, and the like, hexafluorophosphates thereof, and the like. The supporting electrolyte can be present in an amount of 0 to 70 wt %, based on the total weight of the non-aqueous electrolyte.

In an aspect, the non-aqueous electrolyte includes an ionic liquid, for example a room temperature ionic liquid (RTIL). Ionic liquids, also referred to as molten salts because they are liquid at room temperature, e.g., 23° C., can have low volatility, for example a vapor pressure of less than $10^{-5}$ Pascal (Pa), or $10^{-10}$ to $10^{-5}$ Pa at a temperature of 23° C., which can reduce the risk of the separator drying out, and allow for reduction in loss of the electrolyte due to evaporation or entrainment. In an aspect the ionic liquid accounts for substantially all (e.g., at least 80 volume percent (vol %), or at least 90 vol %, or at least 95 vol %, or at least 98 vol %, at least 99 vol %, or at least 99.9 vol %) of the non-aqueous electrolyte.

The ionic liquid includes an anion component and a cation component. The anion of the ionic liquid can include, but is not limited to, one or more of halide, sulfate, sulfonate, carbonate, bicarbonate, phosphate, nitrate, nitrate, acetate, $PF_6$, $BF_4$, trifluoromethanesulfonate (triflate), nonaflate, bis(trifluoromethylsulfonyl)amide, trifluoroacetate, heptafluorobutanoate, haloaluminate, triazolide, or an amino acid derivative (e.g., proline with the proton on the nitrogen removed). The cation of the ionic liquid can include, but is not limited to, one or more of imidazolium, pyridinium, pyrrolidinium, phosphonium, ammonium, sulfonium, thiazolium, pyrazolium, piperidinium, triazolium, pyrazolium, oxazolium, guanidinium, an alkali cation, or dialkylmorpholinium. In an aspect, the room temperature ionic liquid includes an imidazolium as a cation component. In an aspect, the room temperature ionic liquid includes 1-butyl-3-methylimidazolium ("Bmim") as a cation component. In an aspect, the room temperature ionic liquid includes bis(trifluoromethyl-sulfonyl)imide ("TFSI") as an anion component. In an aspect, the room temperature ionic liquid includes 1-butyl-3-methylimidazolium bis(trifluoromethyl-sulfonyl)-imide ("[Bmim][TFSI]"). In an aspect, the room temperature ionic liquid includes 1-butyl-3-methylimidazolium tetrafluoroborate ("$BF_4$") ("[Bmim][$BF_4$]").

In an aspect, the non-aqueous electrolyte includes an ionic liquid that may include an unsubstituted or substituted imidazolium, an unsubstituted or substituted morpholinium, unsubstituted or substituted pyridinium, an unsubstituted or substituted pyrrolidinium, an unsubstituted or substituted piperidinium, an unsubstituted or substituted piperazinium, an unsubstituted or substituted pyrazinium, or a combination thereof. In a particular aspect, the ionic liquid may be 1-ethyl-3-methylimidazolium bis(trifluoromethanesulfonyl) imide, 1-ethyl-3-methylimidazolium bis(fluorosulfonyl)imide, 1-ethyl-3-methylimidazolium bis(pentafluorosulfonyl) imide, 1-ethyl-3-methylimidazolium dicyanamide, 1-ethyl-3-methylimidazolium tetrafluoroborate, 1-butyl-3-methylimidazolium bis(trifluoromethylsulfonyl)imide, 1-butyl-3-methylpyridinium bis(trifluoromethyl-sulfonyl) imide, N-methyl-N-propylpiperidinium bis(trifluoromethanesulfonyl)imide, or a combination thereof.

In an aspect, the non-aqueous electrolyte can comprise a solvate ionic liquid. As used herein, the term "solvate ionic liquid" refers to a stoichiometric (e.g., equimolar) amounts of a salt in a chelating solvent. Solvate ionic liquids are liquid at room temperature, e.g., 23° C., and can have low volatility, for example a vapor pressure of less than $10^{-5}$ Pascal (Pa), or $10^{-10}$ to $10^{-5}$ Pa at a temperature of 23° C., which can reduce the risk of the separator drying out, and allow for reduction in loss of the electrolyte due to evaporation or entrainment. In an aspect, the solvate ionic liquid can account for substantially all (e.g., at least 80 volume percent (vol %), or at least 90 vol %, or at least 95 vol %, or at least 98 vol %, at least 99 vol %, or at least 99.9 vol %) of the non-aqueous electrolyte.

The solvate ionic liquid comprises a chelating solvent and a salt. The chelating solvent is capable of chelating a metal cation. Exemplary chelating solvents can include, but are not limited to, triethylene glycol dimethyl ether, tetraethylene glycol dimethyl ether, pentaethylene glycol dimethyl ether, 18-crown-6 ether, and the like, or a combination thereof. The salt of the solvate ionic liquid may or may not be different from the stabilizing additive. In an aspect, the salt comprises an alkali metal salt, an alkaline earth metal salt, a rare earth metal salt, a Group 11 metal salt, a Group 12 metal salt, a Group 13 metal salt, or a combination thereof. In an aspect, the salt comprises an alkali metal salt, an alkaline earth metal salt, or a combination thereof. For example, the salt can comprise Li, Na, K, Mg, Ca, Sc, La, Al, Zn, or a combination thereof, preferably Li, Na, Mg, K, or a combination thereof. In addition to a metal cation, the salt further comprises an anion component. Suitable anions can include, for example, one or more of halide, sulfate, sulfonate, carbonate, bicarbonate, phosphate, nitrate, nitrate, acetate, $PF_6$, $BF_4$, trifluoromethanesulfonate (triflate), nonaflate, bis(trifluoromethylsulfonyl)amide, bis(fluorosulfonyl)imide, trifluoroacetate, heptafluororobutanoate, haloaluminate, triazolide, dicyanamide, bis(pentafluoroethylsulfonyl)imide, thiocyanate, or a combination thereof. In an aspect, the salt can be, for example, lithium bis(trifluoromethylsulfonyl) amide, lithium bis(fluorosulfonyl)imide, lithium bis(pentafluoroethylsulfonyl)imide, sodium bis(trifluoromethylsulfonyl)amide, sodium bis(fluorosulfonyl)imide, sodium bis(pentafluoroethylsulfonyl)imide, magnesium bis(trifluoromethylsulfonyl)amide, magnesium bis(fluorosulfonyl)imide, magnesium bis(pentafluoroethylsulfonyl)imide, potassium bis(trifluoromethylsulfonyl)amide, potassium bis(fluorosulfonyl)imide, potassium bis(pentafluoroethylsulfonyl)imide, and the like, or a combination thereof.

In an aspect, the non-aqueous electrolyte can comprise the solvate ionic liquid in combination with one or more additional non-aqueous electrolyte. For example, the non-aqueous electrolyte can comprise the solvate ionic liquid in combination with an ionic liquid, an organic solvent, or a combination thereof. When present as a combination, the solvate ionic liquid can be present in the non-aqueous electrolyte in an amount of 1 to 99 volume percent, based on the total volume of the non-aqueous electrolyte. Within this range, the solvate ionic liquid can be present in an amount of at least 5 volume percent, or at least 10 volume percent, or at least 20 volume percent, or at least 30 volume percent, or at least 40 volume percent, or at least 50 volume percent, or at least 60 volume percent, or at least 75 volume percent, or at least 85 volume percent, or at least 95 volume percent. Also within this range, the solvate ionic liquid can be present in an amount of at more 95 volume percent, or at most 90 volume percent, or at most 80 volume percent, or at most 70 volume percent, or at most 60 volume percent, or at most 50 volume percent, or at most 40 volume percent, or at most 30 volume percent, or at most 20 volume percent, or at most 10 volume percent, or at most 5 volume percent.

In an aspect, when the stabilizing additive comprises the cationic Lewis acid, the cationic Lewis acid can comprise a metal cation which is solvated by the chelating solvent, forming the solvate ionic liquid. Stated another way, in an aspect, the non-aqueous electrolyte can comprise a solvate ionic liquid comprising a chelating solvent and a salt, wherein the salt comprises the metal cation of the cationic Lewis acid stabilizing additive.

An electrochemical apparatus is also provided. The electrochemical apparatus includes a chamber including a negative electrode in electronic communication with an electroactive species in a reduced state, and a stabilizing additive, wherein the chamber is configured to receive a fluid mixture including a Lewis acid gas. The electroactive species, the Lewis acid gas, and the stabilizing additive are as disclosed herein.

An electrochemical cell including the electroactive species in a reduced state, a non-aqueous electrolyte, and a stabilizing additive represents another aspect of the present disclosure. In some aspects, the electrochemical cell includes a first electrode including an electroactive species in a reduced state, wherein the electroactive species includes an oxidized state; and at least one reduced state wherein the electroactive species bonds with the Lewis acid gas to form the anion adduct. The electrochemical cell further includes a second electrode including a complementary electroactive layer a first separator between the first electrode and the second electrode, a non-aqueous electrolyte, and a stabilizing additive as described herein.

The electroactive species can be present in an amount of 10 to 90 weight percent (wt %), based on the total weight of the first electrode. Within this range, the electroactive species can be present in an amount of at least 20 wt %, or at least 25 wt %, or at least 30 wt %, or least 40 wt %, or at least 50 wt %, based on the total weight of the first electrode. Also within this range, the electroactive species can be present in an amount of at most 80 wt %, or at most 70 wt %, or at most 60 wt %, or at most 50 wt %, or at most 45 wt %, or at most 40 wt %, based on the total weight of the first electrode. For example, the electroactive species can be present in an amount of 10 to 75 wt %, or 10 to 60 wt %, or 15 to 60 wt %, or 20 to 55 wt %, or 25 to 55 wt % or 30 to 50 wt %, based on the total weight of the first electrode.

The first separator may be a porous separator. The separator may include a polymer film, for example a film including a polyamide, a polyolefin, a polyaramid, a polyester, a polyurethane, an acrylic resin, and the like, or a combination thereof. The polymer may be coated on one or both sides with ceramic nanoparticles. In an aspect, the porous separator can comprise cellulose, a synthetic polymeric material, or a polymer/ceramic composite material. Further examples of separators can include polyvinylidene difluoride (PVDF) separators, polytetrafluoroethylene (PTFE), PVDF-alumina composite separators, and the like.

The separator can serve as a protective layer that can prevent the respective electrochemical reactions at each electrode from interfering with each other. The separator can also help electronically isolate the first and second electrodes from one another or from other components within the electrochemical cell to prevent a short-circuit. A person of ordinary skill, with the benefit of this disclosure, would be able to select a suitable separator.

In an aspect the separator can be partially or completely impregnated with the non-aqueous electrolyte. Impregnating the separator with the non-aqueous electrolyte can be by submerging, coating, dipping, or otherwise contacting the separator with the non-aqueous electrolyte. Some or all of the pores of the porous separator can be partially or completely filled with the non-aqueous electrolyte. In an aspect, the separator can be saturated with the non-aqueous electrolyte.

The second electrode of the electrochemical cell includes a complementary electroactive layer. The complementary electroactive layer includes a second electroactive species which can be the same or different as the electroactive species of the first electrode.

In an aspect, the complementary electroactive layer includes the same electroactive species as the first electrode. In an aspect, the complementary electroactive layer includes a second electroactive species which is different from the first electroactive species of the first electrode. In an aspect, the second electroactive species of the complementary electroactive layer can be an electroactive organic molecule, an electroactive polymer, an electroactive oligomer, an electroactive inorganic complex, an electroactive metallocene, or a combination thereof. The electroactive organic molecule, electroactive polymer, and electroactive oligomer can be as previously described.

In an aspect, the second electroactive species can be an electroactive inorganic complex, for example an alkali metal-transition metal oxide or an alkali metal-transition metal phosphate of the formula $$AM^1X$$

wherein A is Li, Na, or K; $M^1$ is Ni, Co, Mn, Al, Ti, Mo, Fe, V, Si, or a combination thereof; and X is $O_2$ or $PO_4$. In an aspect, the second electroactive species can be $LiFePO_4$.

In an aspect, the second electroactive species of the complementary electroactive layer includes a metallocene. An example of a suitable metallocene can include, but is not limited to ferrocene, or a polymer including repeating units derived from ferrocene (e.g., polyvinyl ferrocene), or derivatives thereof.

During operation of the electrochemical cell, the second electroactive species of the complementary electroactive layer can serve as a source of electrons for the reduction of the electroactive active species of the first electrode. Likewise, the second electroactive species of the complementary electroactive layer can serve as a sink for electrons during the oxidation of the electroactive species of the first electrode.

In an aspect, the second electrode can further comprise a substrate, which can be positioned proximate to or between complementary electroactive layers. The substrate can be in direct or indirect contact with the complementary electroactive layer or layers. When present, the substrate can include, for example, carbon paper (treated, TEFLON-treated, or untreated), carbon cloth, nonwoven carbon mat, or a nonwoven carbon nanotube mat. In an aspect, the substrate of the second electrode can be a conductive material and act as a current collector within the electrochemical cell.

In an aspect, the first electrode can be a negative electrode, and the second electrode can be a positive electrode. The terms negative electrode and positive electrode are used for convenience and clarity, although they may be technically accurate only when the Lewis acid gas is being acquired or released.

In an aspect, the second electrode can be positioned between first electrodes. Each of the first electrodes can comprise the disclosed electroactive species in a reduced state, non-aqueous electrolyte, and stabilizing additive. In an aspect the first electrodes and/or second electrodes can be identical in configuration or composition.

In an aspect, the electrochemical cell includes a single separator, disposed between the first electrode and the second electrode, e.g., between the negative electrode and the positive electrode. Electrochemical cells can be combined to make a stack in any suitable combination of parallel and series configurations. In an aspect, the electrochemical cell can comprise more than one separator. For example, one of skill in the art would understand that depending on the selected combination of series and parallel configurations, a single separator may be used, or a plurality of separators may be preferred.

The electrochemical cell can optionally further comprise a gas permeable layer. The gas permeable layer can be positioned adjacent to the first electrode, on a side opposite the separator. The gas permeable layer can comprise a conductive solid material and act as a current collector within the cell. The gas permeable layer can comprise a porous material. In an aspect, the gas permeable layer has a porosity, for example, of greater than or equal to 60%, greater than or equal to 70%, greater than or equal to the 75%, greater than or equal to 80%, or greater. In an aspect, the gas permeable layer has a porosity of less than or equal to 85%, less than or equal to 90%, or more. Combinations of these ranges are possible. For example, in an aspect, the gas permeable layer of the first electrode has a porosity of greater than or equal to 60% and less than or equal to 90%. Other porosities are also possible. Examples of suitable materials for the gas permeable layer include, without limitation, carbon paper (treated, TEFLON-treated, or untreated), carbon cloth, and nonwoven carbon mat.

The electrochemical cell may optionally include a gas flow field. The gas flow field, when present, may be positioned adjacent to the gas permeable layer, on a side opposite the first electrode. When the gas permeable layer is not present in the electrochemical cell, the gas flow field may be positioned adjacent to the first electrode, on a side opposite the separator.

The electrochemical cell can be particularly useful for the separation of a Lewis acid gas from a fluid mixture when the fluid mixture is contacted with the electrochemical cell, and thus is particularly well suited for use in a gas separation system. The gas separation system includes a plurality of electrochemical cells in fluid communication with a gas inlet and a gas outlet.

The fluid mixture, also referred to as the input gas, can be at least partially separated upon exposure to the electrochemical cell. The fluid mixture can be, for example, ambient air (e.g., air from an ambient environment, such as outdoor air). In an aspect, the gas separation system can be used for direct air capture. The systems and methods described herein can be useful for removing a Lewis acid gas such as carbon dioxide directly from ambient air (e.g., to reduce greenhouse gas levels), without the need for any pre-concentration step. Certain aspects of the present disclosure can make the systems and methods described herein particularly useful for direct air capture (e.g., an ability to bond with a Lewis acid gas while being thermodynamically disfavored with reacting with major components of ambient air, such as oxygen).

In an aspect, the concentration of the Lewis acid gas in the fluid mixture is relatively low, for example when the fluid mixture is ambient air. For example, the concentration of the Lewis acid gas in the fluid mixture prior to exposure to the electrochemical cell can be less than or equal to 500 ppm, or less than or equal to 450 ppm, or less than or equal to 400 ppm, or less than or equal to 350 ppm, or less than or equal to 300 ppm, or less than or equal to 200 ppm. In an aspect, the concentration of the Lewis acid gas in the fluid mixture can be as low as 100 ppm, or as low as 50 ppm, or as low as 10 ppm.

In an aspect, the fluid mixture (e.g., input fluid mixture) is ventilated air. The ventilated air can be air in an enclosed or at least partially enclosed place (e.g., air being circulated in an enclosed place). Examples of places in which the fluid mixture (e.g., ventilated air) can be located include, but are not limited to sealed buildings, partially ventilated places, car cabins, inhabited submersibles, air crafts, and the like.

The concentration of Lewis acid gas in the ventilated air can be greater than ambient air but lower than concentrations typical for industrial processes. In an aspect, the concentration of the Lewis acid gas in the fluid mixture prior to exposure to the electrochemical cell is less than or equal to 5,000 ppm, or less than or equal to 4,000 ppm, or less than or equal to 2,000 ppm, or less than or equal to 1,000 ppm. In an aspect, the concentration of the Lewis acid gas in the fluid mixture (e.g., when it is ventilated air/air in enclosed spaces) is as low as 1,000 ppm, or as low as 800 ppm, or as low as 500 ppm, or as low as 200 ppm, or as low as 100 ppm, or as low as 10 ppm.

In an aspect, the fluid mixture includes oxygen gas ($O_2$). In an aspect, the fluid mixture has a relatively high concentration of oxygen gas (e.g., prior to exposure to the electrochemical cell). Certain aspects of the systems and methods described herein (e.g., the choice of particular electroactive species, methods of handling gases in the system, etc.) can contribute to an ability to capture Lewis acid gases in fluid mixtures in which oxygen gas is present without deleterious interference. In an aspect, oxygen gas is present in the fluid mixture (e.g., prior to exposure to the electrochemical cell) at a concentration of greater than or equal to 0 vol %, or greater than or equal to 0.1 vol %, or greater than or equal to 1 vol %, or greater than or equal to 2 vol %, or greater than or equal to 5 vol %, or greater than or equal to 10 vol %, or greater than or equal to 20 vol %, or greater than or equal to 50 vol %, or greater than or equal to 75 vol %, or greater than or equal to 90 vol %, greater than or equal to 95 vol %. In an aspect, oxygen gas is present in the fluid mixture at a concentration of less than or equal to 99 vol %, or less than or equal to 95 vol %, or less than or equal to 90 vol %, or less than or equal to 75 vol %, or less than or equal to 50 vol %, or less than or equal to 25 vol %, or less than or equal to 21 vol %, or less than or equal to 10 vol %, or less than or equal to 5 vol %, or less than or equal to 2 vol %.

In an aspect, the fluid mixture includes water vapor. The fluid mixture can comprise water vapor for example, because it is or includes ambient air or ventilated air. In an aspect, the fluid mixture (e.g., prior to exposure to the electrochemical cell) has a relatively high relative humidity. For example, in an aspect, the fluid mixture can have a relative humidity of greater than or equal to 0%, or greater than or equal to 5%, or greater than or equal to 10%, or greater than or equal to 25%, or greater than or equal to 50%, or greater than or equal to 75%, or greater than or equal to 90% at least one temperature in the range of −50 to 140° C. In an aspect, the fluid mixture can have a relative humidity of less than or equal to 100%, or less than or equal to 95%, or less than or equal to 90%, or less than or equal to 75%, or less than or equal to 50%, or less than or equal to 25%, or less than or equal to 10% at least one temperature in the range of −50 to 140° C.

The Lewis acid gas can be separated from the fluid mixture in the gas separation system by applying a potential difference across the electrochemical cells of the gas separation system. One of ordinary, with the benefit of this disclosure, would understand how to apply a potential across the electrochemical cell. For example, the potential can be applied by connecting the negative electrode and the positive electrode to a suitable power source capable of polarizing the negative and positive electrodes. In an aspect the power supply can be a DC voltage. Nonlimiting examples of a suitable power source include batteries, power grids, regenerative power supplies (e.g., wind power generators, photovoltaic cells, tidal energy generators), generators, and the like, and combinations thereof.

The potential difference can be applied to the electrochemical cells during at least a portion of the time that a fluid mixture is exposed to the electrochemical cell. In an aspect, the potential difference can be applied prior to exposing the fluid mixture to the electrochemical cell.

Application of a potential difference to the electrochemical cell, during a charging mode, results in a redox reaction at the negative electrode wherein the electroactive species is reduced. As discussed herein, the electroactive species is selected for having a greater affinity for the Lewis acid gas when it is in a reduced state relative to when it is in an oxidized state. By reducing the electroactive species and passing a fluid mixture across the first electrode, the Lewis acid gas can bond to the electroactive species. In this way the Lewis acid gas can be removed from the fluid mixture to provide a treated fluid mixture (e.g., including a lesser amount of the Lewis acid gas relative to the initial fluid mixture).

The potential difference applied across the electrochemical cell during the charge mode can have a particular voltage. The potential difference applied across the electrochemical cell can depend, for example, on the reduction potential for the generation of at least one reduced state of the first electroactive species, as well as the standard potential for the interconversion between a reduced state and an oxidized state of the electroactive species in the second electrode. The voltage further includes the current multiplied by the stack electrochemical resistance. In an aspect, the potential difference is at least 0 V, or at least 0.1 V, or at least 0.2 V, or at least 0.5 V, or at least 0.8 V, or at least 1.0 V, or at least 1.5 V. In an aspect, the potential difference is less than or equal to 2.0 V, or less than or equal to 1.5 V, or less than or equal to 0.5 V, or less than or equal to 0.2 V.

In an aspect, when the electroactive species of the first electrode includes a quinone, the electroactive species can be reduced to at least one of its reduced states.

In an aspect, when the electroactive species of the first electrode includes a quinone and the electroactive species is reduced in the presence of a Lewis acid gas, for example carbon dioxide, the reduced form of the electroactive species can bond with the carbon dioxide.

In an aspect, while the electroactive species is reduced at the first electrode, a second electroactive species (e.g., a redox active polymer such as polyvinyl ferrocene) is being oxidized at the second electrode. During the charge mode, the oxidation of the second electroactive species provides a source of electrons for driving the reduction of the first electroactive species.

While the exemplary reaction described above takes place in one direction, it will be understood that some reversibility can be exhibited. Analogous reaction can take place with different electroactive species, as would be understood by a person of ordinary skill in the art.

In an aspect, a relatively large amount of the Lewis acid gas is removed from the fluid mixture during the processes described herein. Removing a relatively large amount of the Lewis acid gas can, in some cases, be beneficial for any of a variety of applications, such as capturing gases that can be deleterious if released into the atmosphere for environmental reasons. For example, the Lewis acid gas can comprise carbon dioxide, and removing a relatively high amount of the carbon dioxide from fluid mixture can be beneficial to either limit the greenhouse gas impact of a process (e.g., an industrial process or transportation process) or to even reduce the amount of carbon dioxide in a room or the atmosphere (either for thermodynamic reasons for heating and air conditioning processes or for environmental reasons).

In an aspect, the amount of Lewis acid gas in a treated fluid mixture (e.g., a fluid mixture from which an amount of the Lewis acid gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% of the amount (in vol %) of the Lewis acid gas in the original fluid mixture prior to treatment (e.g., the amount of the target in the fluid mixture prior to being exposed to electrochemical cell). In an aspect, the amount of Lewis acid gas in a treated fluid mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5% of the amount (in vol %) of the Lewis acid gas in the original fluid mixture prior to treatment.

In an aspect, a second potential difference can be applied across the electrochemical cell after at least a portion of the Lewis acid gas is bonded to the electroactive species. The second potential difference can be different than the first potential difference. In an aspect, applying the second potential difference results in a step of releasing a portion or all of the Lewis acid gas bonded with the electroactive species to produce a second treated fluid mixture. The second treated fluid mixture can have a greater amount of the Lewis acid gas than the input fluid mixture. For example, Lewis acid gas may be present in the second treated fluid mixture in an amount such that its vol % is 10% greater, 20% greater 50% greater, 100% greater, 200% greater, 1,000% greater, and/or up to 2,000% greater, 5,000% greater, 10,000% greater, or more than the amount of Lewis acid gas in the input fluid mixture.

In an aspect, a mixture of the electroactive species, the stabilizing additives, and the non-aqueous electrolytes, herein known as the "electrolyte solution", is brought in contact with the first electrode in the first electrode chamber (half-cell) of the electrochemical cell, where the electroactive species in the electrolyte solution is reduced (activated). The electrolyte solution is also brought in contact with the fluid mixture of Lewis acid gas either simultaneously in the first electrode chamber during the reduction process, or subsequent to the reduction process, in a liquid-gas contactor. Upon this contact, the electroactive species is bonded with and captures the Lewis acid gas to form the anion adduct. The electrolyte solution is then brought into the second half cell of the electrochemical cell, where it is contacted with a second electrode at an oxidizing potential, and the Lewis acid gas is released.

The gas separation system can comprise an external circuit connecting the negative electrode and the positive electrode of each electrochemical cell to a power source configured to apply a potential difference across the negative electrode (anode) and the positive electrode (cathode) of each electrochemical cell. Each of the electrochemical cells of the gas separation system can be as described above. The electrochemical cells of the gas separation system can be stacked according to various configurations that are generally known in the art, including parallel or in series.

In an aspect, a gas separation system includes a first set of electrochemical cells and a second set of electrochemical cells. Each of the first set and the second set can comprise one or more electrochemical cells as described throughout this disclosure. The first and second set can be made to run in parallel in an alternating fashion, such that one set of cells is operating in a charge mode and capturing a Lewis acid gas (e.g., $CO_2$) from a fluid mixture while another set of cells is operating in a discharge mode and releasing the Lewis acid gas (e.g., $CO_2$). The system can comprise separate housings for each of the sets of electrochemical cells. The system can further comprise conduits and valving arranged to direct flow in a desired manner. The gas separation system can allow for nearly continuous separation of a fluid mixture (e.g., gas stream), with the fluid mixture being directed to the set of cells operating in a charge/capture mode, at a given moment, while a separate Lewis acid gas-rich treated mixture is produced by the other set of cells operating in a discharge/release mode. Furthermore, additional sets of electrochemical cells may be added in parallel or in series, according to the needs of the application.

In another aspect, the electroactive species, the stabilizing additive, and the non-aqueous electrolytes are combined to form an "electrolyte solution" that can be contacted with the first electrode in a first electrode chamber (or half-cell) of the electrochemical cell, wherein the electroactive species in the electrolyte solution is in a reduced state. The electrolyte solution can be contacted with the fluid mixture comprising the Lewis acid gas using a liquid/gas contactor simultaneously in the first electrode chamber during the reduction process, or the electrolyte solution can be contacted with the fluid mixture comprising the Lewis acid gas using a liquid/gas contactor subsequent to the reduction process. Upon this contacting step, the electroactive species is bonded with and "captures" the Lewis acid gas to form the anion adduct. The electrolyte solution can then be transferred into a second chamber (or half-cell) of the electrochemical cell and contacted with a second electrode at an oxidizing potential, thereby releasing the "captured" Lewis acid gas.

The fluid mixture (e.g., a gas stream such as an input gas stream) can be introduced to the gas separation system at a particular flow rate. In an aspect, the flow rate can be greater than or equal to 0.001 liters per second (L/s), greater than or equal to 0.005 L/s greater than or equal to 0.01, greater than or equal to 0.05 L/s, greater than or equal to 0.1 L/s, greater than or equal to 0.5 L/s, greater than or equal to 1 L/s, greater than or equal to 5 L/s, greater than or equal to 10 L/s, greater than or equal to 10 50 L/s, or greater than or equal to 100 L/s. In an aspect, the flow rate of the fluid mixture (e.g., a gas stream such as an input gas stream) can be less than or equal to 500 L/s, less than or equal to 400 L/s, less than or equal to 300 L/s, less than or equal to 200 L/s, less than or equal to 100 L/s, less than or equal to 50 L/s, less than or equal to 10 L/s, less than or equal to 1 L/s, less than or equal to 0.5 L/s, or less than or equal to 0.1 15 L/s.

In an aspect, during or after the step of releasing the Lewis acid gas, the method further includes applying a vacuum condition to the electrochemical cell to remove at least a portion or all of the released Lewis acid gas from the electrochemical cell. One of ordinary skill, with the benefit of this disclosure, would understand suitable techniques and equipment for applying a vacuum condition to the electrochemical cell. For example, a vacuum pump can be fluidically connected to a gas outlet of the electrochemical cell. The vacuum pump can be operated to produce a negative pressure differential between the electrochemical cell bed and a downstream location. This vacuum condition can provide a force sufficient to cause Lewis acid gas released during the releasing step described above to flow out of the electrochemical cell. The vacuum condition can be applied such that the pressure inside the electrochemical cell during or after the releasing of the Lewis acid gas is less than or equal to 760 torr, less than or equal to 700 torr, less than or equal to 500 torr, less than or equal to 100 torr, less than or equal to 50 torr, less than or equal to 10 torr, and/or as low as 5 torr, as low as 1 torr, as low as 0.5 torr, as low as 0.1 torr.

Various components of a system, such as the electrodes (e.g., negative electrode, positive electrode), power source, separator, container, circuitry, insulating material, and the like can be fabricated by those of ordinary skill in the art from any of a variety of components. Components can be molded, machined, extruded, pressed, isopressed, printed, infiltrated, coated, in green or fired states, or formed by any other suitable technique.

The electrodes described herein (e.g., negative electrode, positive electrode) can be of any suitable size or shape. Non-limiting examples of shapes include sheets, cubes, cylinders, hollow tubes, spheres, and the like. The electrodes may be of any suitable size, depending on the application for which they are used (e.g., separating gases from ventilated air, direct air capture, or the like). Additionally, the electrode can comprise a means to connect the electrode to another electrode, a power source, and/or another electrical device. Those of ordinary skill in the art are readily aware of techniques for forming components of the system herein.

Various electrical components of the system may be in electrical communication with at least one other electrical component by a means for connecting. A means for connecting can be any material that allows the flow of electricity to occur between a first component and a second component. A non-limiting example of a means for connecting two electrical components is a wire including a conductive material (e.g., copper, silver, or the like). In an aspect, the system can comprise electrical connectors between two or more components (e.g., a wire and an electrode). In an aspect, a wire, electrical connector, or other means for connecting can be selected such that the resistance of the material is low. In an aspect, the resistance can be substantially less than the resistance of the electrodes, electrolyte, or other components of the system.

Electrochemical cells and gas separation systems of the present disclosure can further be as described in U.S. patent application Ser. No. 16/659,398, the contents of which is incorporated by reference in its entirety for all purposes.

The electrochemical cells, systems, and methods described herein can be implemented in a variety of applications. The number of electrochemical cells or sets of cells can be scaled to the requirements of a particular application as needed. The following aspects provide several non-limiting examples of applications. In an aspect, the systems and methods described herein can be for removing a Lewis acid gas (e.g., $CO_2$) from ambient air, as well as enclosed spaces such as airtight building, car cabins—reducing the heating cost of incoming air for ventilation—and submarines and space capsules, where an increase in $CO_2$ levels could be catastrophic. In aspects directed to the electrical power industry, they can be used for capturing carbon dioxide post-combustion at varying concentrations. In an aspect, the systems and methods are suitable for separate Lewis acid gases from industrial flue gas or industrial process gas. Also, they can be used for capturing sulfur dioxide and other gases from flue gas. In aspects directed to the oil and gas industry, the disclosed systems and methods can be used for capturing carbon dioxide and other gases from various processes and diverting them for downstream compression or processing. The disclosed systems and methods can be applied to capture carbon dioxide from burning natural gas used to heat the greenhouses in mild and cold climates, then diverting the captured dioxide into the greenhouse for the plants to use in photosynthesis, i.e., to feed the plants.

This disclosure is further illustrated by the following examples, which are non-limiting.

EXAMPLES

Example 1

This example describes the reactivity of an electroactive species with Lewis acid gas as studied by cyclic voltammetry (CV).

FIG. 1 shows the overlaid (CV) data for 5,6,7,8-tetrachloronaphthoquinone (1 millimolar, mM) in the presence of varying concentrations of the cationic Lewis acid additive Li(TFSI) in $CO_2$-saturated DMF and 100 mM of tetrabutylammonium hexafluorophosphate supporting electrolyte. In the absence of the Lewis acid salt additive, the reversibility of the reduction corresponding to the semiquinone anion formation (located at approximately −0.9 V) is largely retained, indicating a weak interaction with $CO_2$ to form an anion adduct. The addition of the Lewis acid salt additive Li(TFSI) leads to a positive shift in reduction potential demonstrating that the product formed is an ion-paired $CO_2$ bound species rather than an unbound reduced species.

Figure 2:
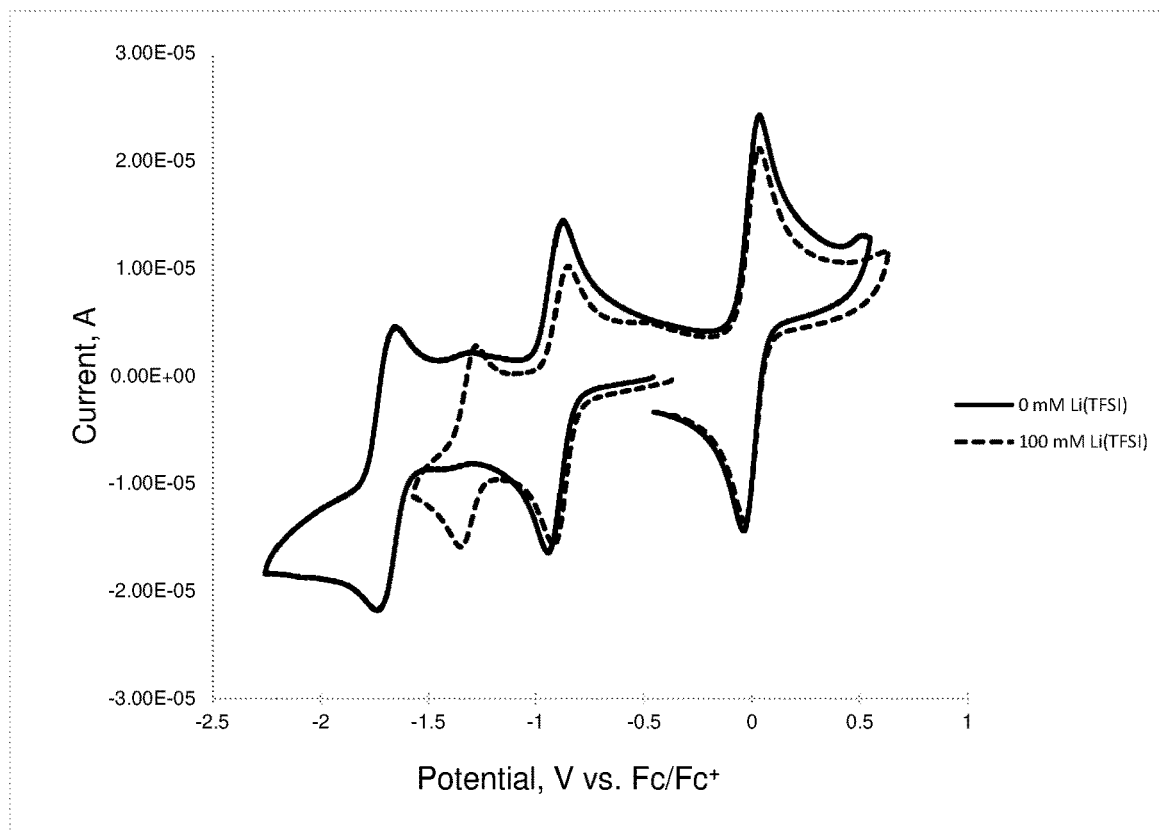
FIG. 2 is a graph of current (A) versus potential (V vs. $Fc/Fc^+$) and shows overlaid cyclic voltammograms as described in Example 1.

FIG. 2 shows the overlaid CV data of 5,6,7,8-tetrachloronaphthoquinone (1 mM), 100 mM of tetrabutylammonium hexafluorophosphate supporting electrolyte, in the presence of varying concentrations of the cationic Lewis acid additive Li(TFSI) under an inert atmosphere of nitrogen in DMF. The second redox couple corresponding to the semiquinone reduction to the quinone dianion (−1.7 V, solid black trace) is sensitive to Li(TFSI), as indicated by the positive shift in potential. However, the semiquinone is unaffected. This demonstrates that the product formed is an ion-paired reduced species rather than an unbound reduced species.

Figure 3:
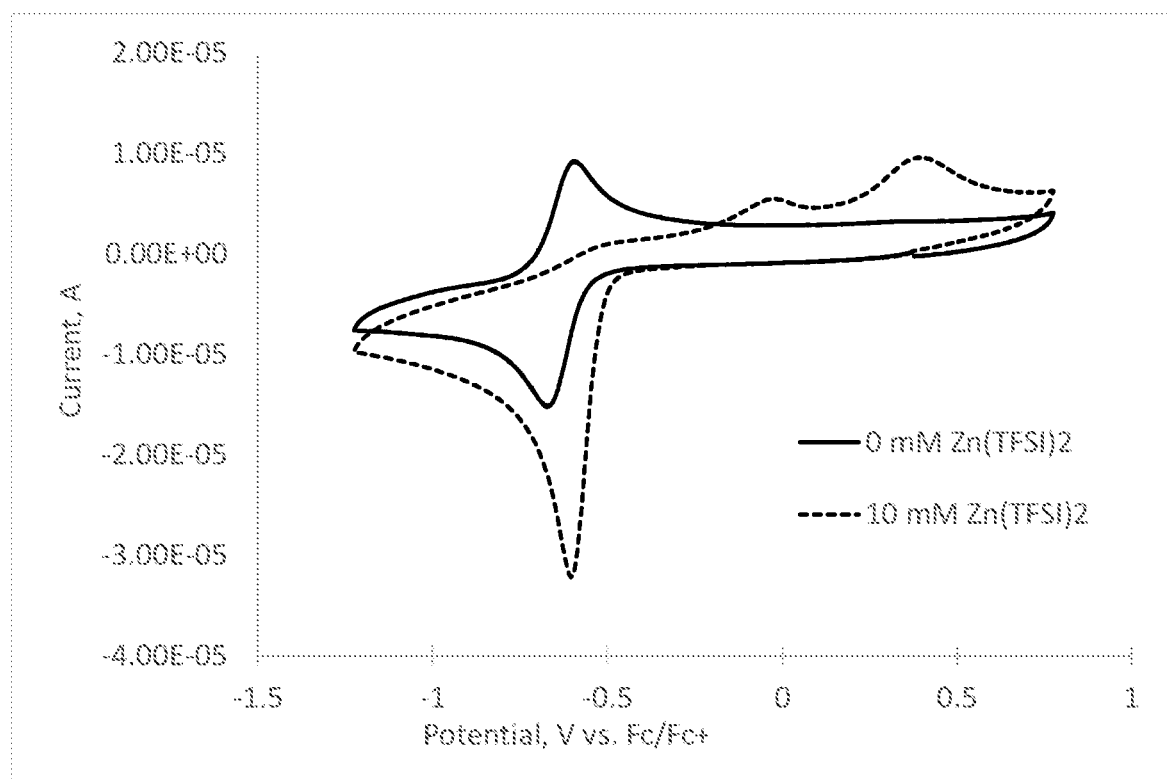
FIG. 3 is a graph of current (A) versus potential (V vs. $Fc/Fc^+$) and shows overlaid cyclic voltammograms as described in Example 1.

FIG. 3 shows the overlaid cyclic voltammetry data for 2,3-difluoro-1,4,-benzoquinone (1 mM) under nitrogen in DMF with 100 mM of tetrabutylammonium hexafluorophosphate supporting electrolyte, demonstrating strong ion pair interactions with $Zn(TFSI)_2$ through the loss of reversibility of the quinone/semiquinone redox couple (−0.7 V) and the formation of two new anodic peaks (0.0 V and 0.4 V). This type of irreversible ion pairing inhibits $CO_2$ reactivity due to stabilization of the reactive semiquinone.

As demonstrated by Example 1, the cationic Lewis acid stabilizing additive may be selected to kinetically and/or thermodynamically favor an ion-paired $CO_2$ bound species rather than an unbound reduced species.

Example 2

This example describes the reactivity of an electroactive species with Lewis acid gas as studied by cyclic voltammetry (CV).

Figure 4:
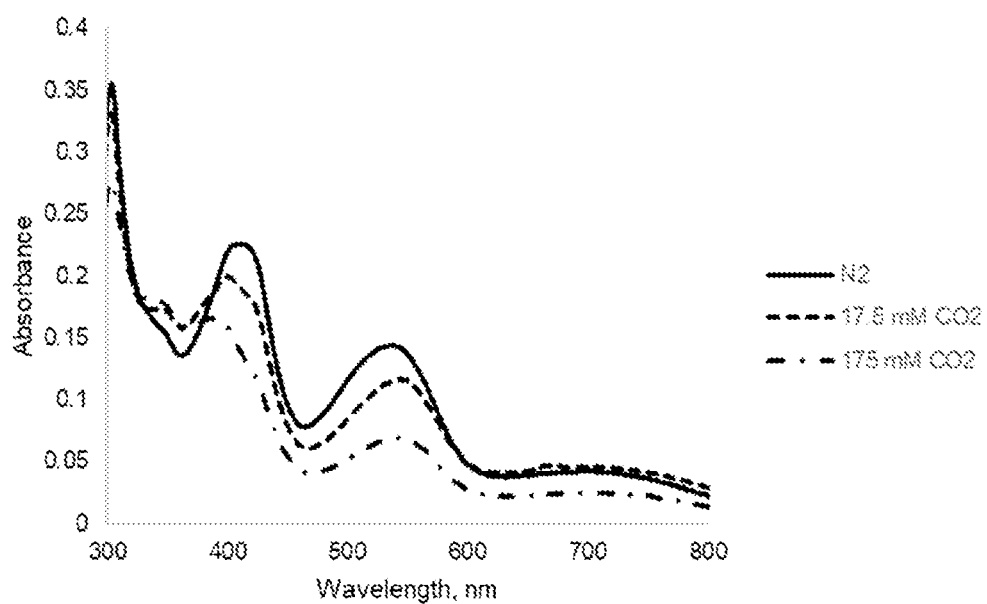
FIG. 4 is a graph of absorbance (arbitrary unit) versus wavelength (nanometers, nm) and show overlaid absorbance spectra as described in Example 2.

FIG. 4 shows the overlaid UV-visible spectroscopy data for the reaction of the one electron reduced semiquinone of 6-cyano-1,4-naphthoquinone (6CN) under $N_2$ (solid line), 17.5 mM $CO_2$ (dotted line) and 1.75 mM $CO_2$ (dash-dotted line). The concentration of the semiquinone was 45 μM in dimethylformamide.

Figure 5:
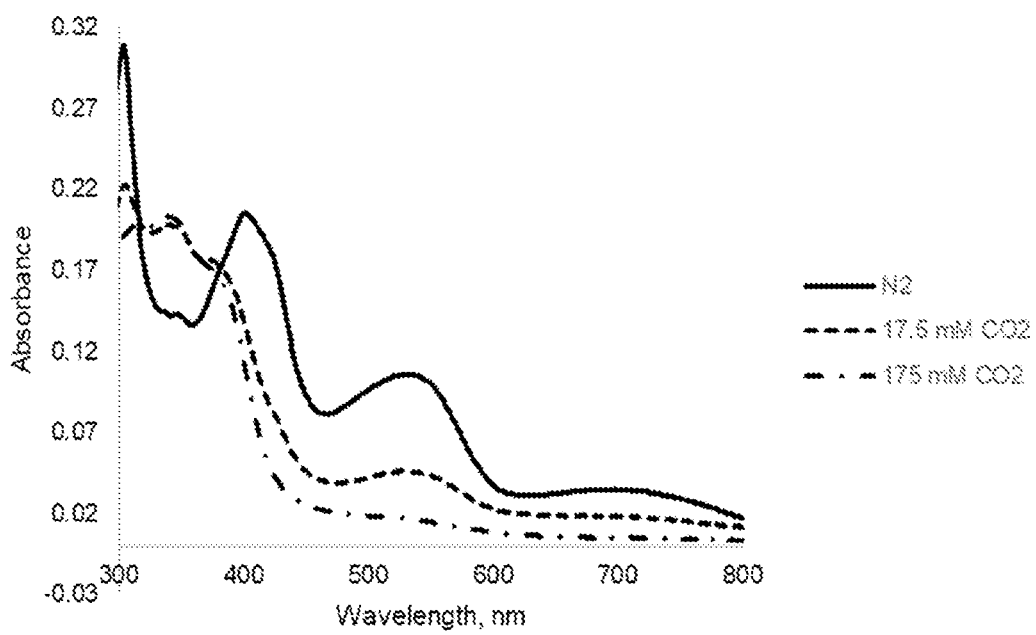
FIG. 5 is a graph of absorbance (arbitrary unit) versus wavelength (nm) and show overlaid absorbance spectra as described in Example 2.

FIG. 5 shows the overlaid UV-visible spectroscopy data for the reaction of the one electron reduced semiquinone of 6CN with 100 equivalents (45 mM) LiTFSI under $N_2$ (solid line), 17.5 mM $CO_2$ (dotted line) and 1.75 mM $CO_2$ (dash-dotted line). The concentration of the semiquinone was 45 µM in dimethylformamide.

Figure 6:
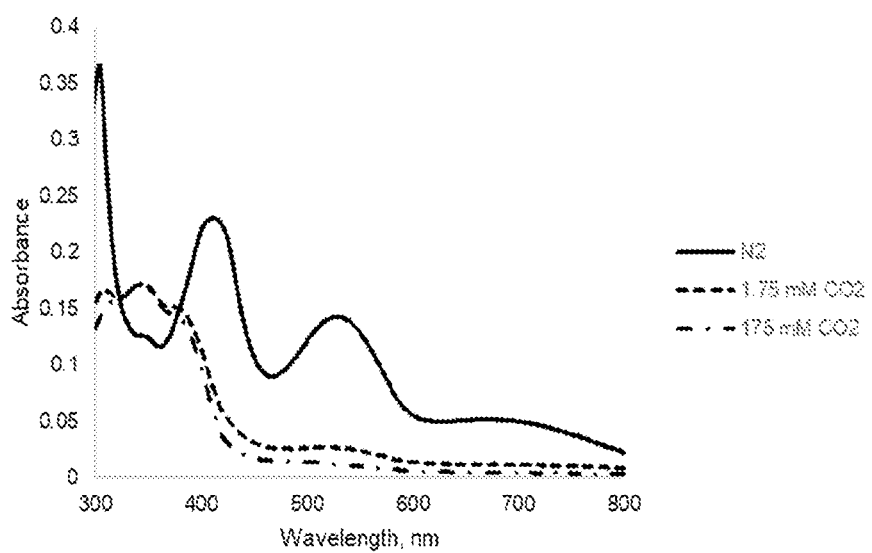
FIG. 6 is a graph of absorbance (arbitrary unit) versus wavelength (nm) and show overlaid absorbance spectra as described in Example 2.

FIG. 6 shows the overlaid UV-visible spectroscopy data for the reaction of the one electron reduced semiquinone of 6CN with 500 equivalents (22.5 mM) LiTFSI under $N_2$ (solid line), 17.5 mM $CO_2$ (dotted line) and 1.75 mM $CO_2$ (dash-dotted line). The concentration of the semiquinone was 45 µM in dimethylformamide.

The data in FIGS. 4-6 was analyzed to determine the equilibrium constants ($K_{CO2}$) of the one electron reduced semiquinone of 6-cyano-1,4-naphthoquinone (6CN) with $CO_2$ in the presence of 0, 100, or 500 equivalents of LiTFSI. The results of the analysis are shown in Table 1.

TABLE 1

| Sample | $K_{CO2}$ |
| --- | --- |
| 6CN | 16 |
| 6CN + 100 equivalents of LiTFSI | 160 |
| 6CN + 500 equivalents of LiTFSI | 5,000 |

Table 2 shows the compiled rate data for the reaction of the one electron reduced semiquinone of 6CN with $CO_2$ ($k_{CO2}$) or $O_2$ ($k_{O2}$). The reaction rates were determined by kinetic analysis of the change in absorbance of the UV-visible spectra versus time. $E_1$ in Table 2 is the peak potential (in volts versus ferrocene (Fc/Fc$^+$)).

TABLE 2

| Sample | $E_1$, V vs Fc/Fc$^+$ | $k_{O2}$ (M$^{-1}$ s$^{-1}$) | $k_{CO2}$ (M$^{-1}$ s$^{-1}$) | $k_{CO2}/k_{O2}$ |
| --- | --- | --- | --- | --- |
| 6CN | −0.88 | 0.10 | 0.28 | 2.8 |
| 6CN + 100eq Li | −0.84 | 0.18 | 1.0 | 5.6 |

Example 3

Figure 7:
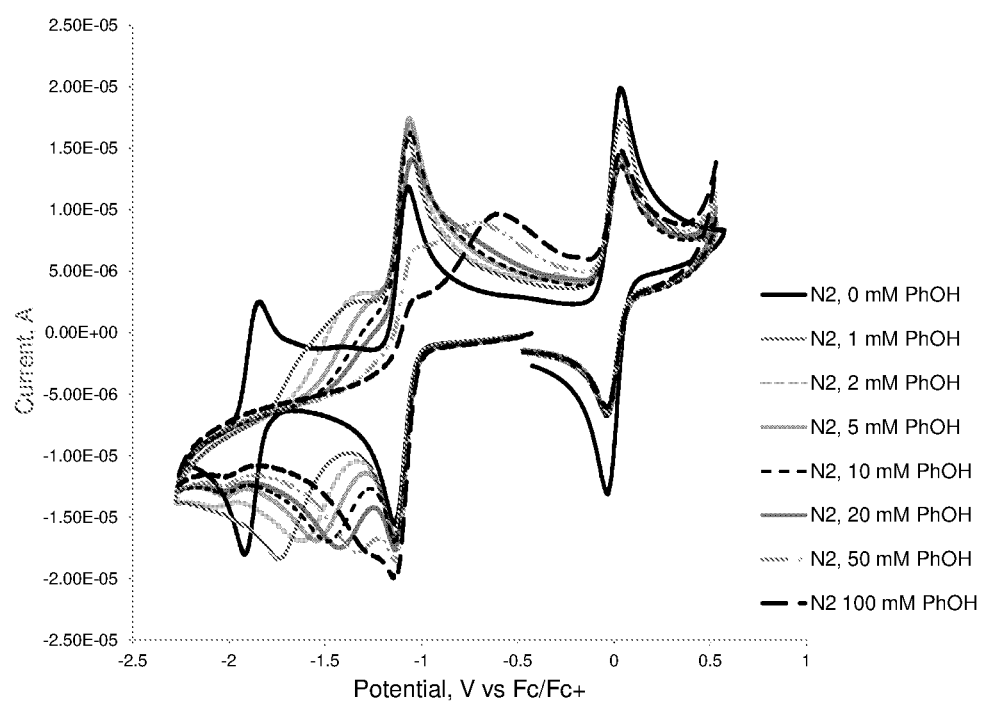
FIG. 7 is a graph of current (A) versus potential (V vs. $Fc/Fc^+$) and show overlaid cyclic voltammograms as described in Example 3.

FIG. 7 shows the overlaid CV data for 2,3-diphenylnaphthoquinone ($Ph_2NQ$) (1 mM) in the presence of varying concentrations of phenol (PhOH) in a nitrogen-sparged DMF solution with 100 mM tetrabutylammonium hexafluorophosphate supporting electrolyte. The results in FIG. 7 demonstrate the effect of phenol titration (as a hydrogen bond donor additive) on the reduced states of $Ph_2NQ$ ($Ph_2NQ^-$ and $Ph_2NQ^{2-}$) in the absence of a Lewis Acid gas.

Example 4

Figure 8:
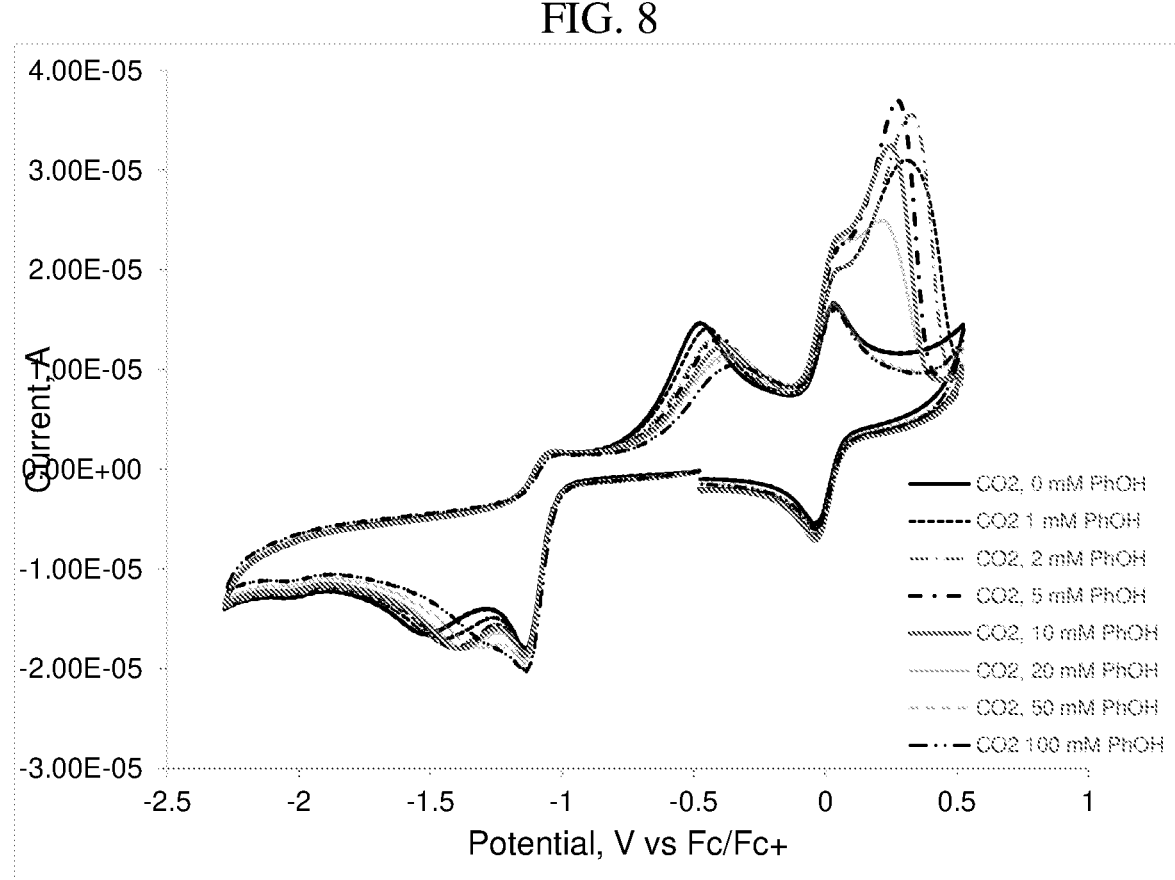
FIG. 8 is a graph of current (A) versus potential (V vs. $Fc/Fc^+$) and shows overlaid cyclic voltammograms as described in Example 4.

FIG. 8 shows the overlaid CV data for 2,3-diphenylnaphthoquinone ($Ph_2NQ$) (1 mM) in the presence of varying concentrations of phenol (PhOH) in a $CO_2$-saturated DMF solution with 100 mM tetrabutylammonium hexafluorophosphate supporting electrolyte. The results in FIG. 8 demonstrate the effect of phenol titration (as a hydrogen bond donor additive) on the anion adduct ($Ph_2NQ(CO_2)_2^{2-}$) between the reduced states of $Ph_2NQ$ and the Lewis Acid gas ($CO_2$).

Table 3 shows the calculated thermodynamic data derived from FIG. 7 and FIG. 8, showing the shift in peak potential (ΔE versus $Ph_2NQ$), average number of hydrogen bond interactions with respected to quinone (n), and equilibrium constant ($K_{eq}$) for the formation of the hydrogen-bond complex between the phenol additive and corresponding reduced species.

TABLE 3

| Sample | ΔE | n | $K_{eq}$ |
| --- | --- | --- | --- |
| $Ph_2NQ$ | 0 | 0 | 0 |
| $Ph_2NQ^2$ | 0.35 | 3.9 | $4.3 \times 10^{13}$ |
| $Ph_2NQ(CO_2)_2^{2-}$ | 0.072 | 0.76 | $1.0 \times 10^3$ |

Example 5

Punched disks (16 mm diameter) of a carbon nanotube (CNT) mat, obtained as Miralon™, commercially available from Nanocomp Technologies, Inc., were submerged in a solution of poly(5-cyano-2,3-diphenylnaphthoquinone) (10 mg mL$^{-1}$ in NMP) for 12 hours, then removed and rinsed with toluene. The disks were dried in a commercial dehydrator at 65° C. for five hours, then assembled into a cell with poly(vinyl ferrocene) counter electrode and Celgard 3401 separator in a sealed cell with $CO_2$ atmosphere with 6 mL headspace volume. In one cell the electrolyte was the ionic liquid Bmim-TFSI; an identical cell was prepared using 100 mM LiTFSI in Bmim-TFSI.

Figure 9:
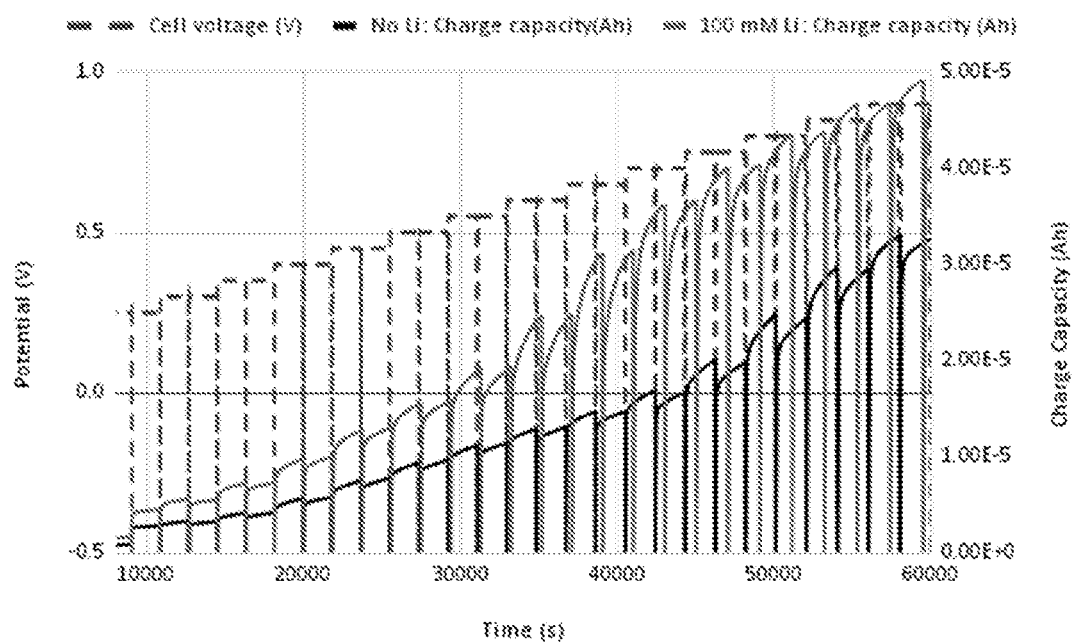
FIG. 9 is a graph of applied potential (V, left) and charge capacity (Ah, right) versus time during a sealed cell charging experiment with and without LiTFSI as described in Example 5.

FIG. 9 shows the applied potential (left) and charge capacity per cycle (right) for each of these two electrodes, illustrating the onset of increased charging at milder potentials in the presence of 100 mM lithium.

Figure 10:
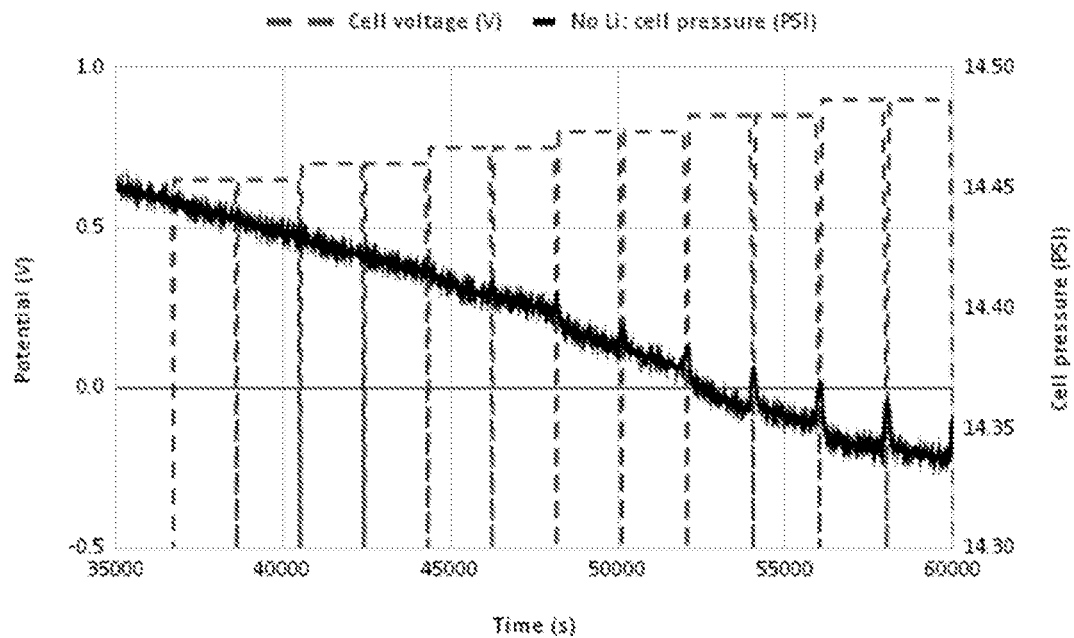
FIG. 10 is a graph of applied potential (V, left) and cell headspace pressure (PSI, right) versus time during a sealed cell charging experiment as described in Example 5.

FIG. 10 shows the pressure change (right) in headspace of the sealed cell using Bmim-TFSI electrolyte without lithium as a function of applied potential (left). Headspace pressure decreases as $CO_2$ is captured by the electrode during charge and increases as $CO_2$ is released during release.

Figure 11:
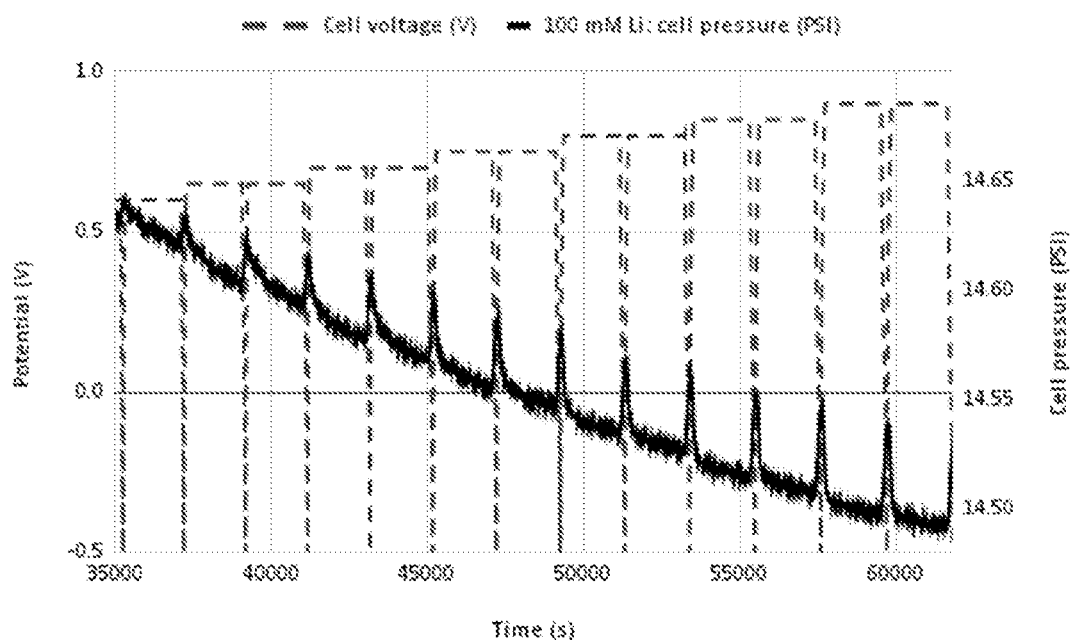
FIG. 11 is a graph of applied potential (V, left) and cell headspace pressure (PSI, right) versus time during a sealed cell charging experiment as described in Example 5.

FIG. 11 shows the pressure change (right) in headspace of the sealed cell using Bmim-TFSI electrolyte with 100 mM lithium as a function of applied potential (left). Headspace pressure decreases as $CO_2$ is captured by the electrode during charge and increases as $CO_2$ is released during release. The comparison with FIG. 10 illustrates the onset of $CO_2$ capture at significantly milder applied potentials.

Example 6

A pressure-sealed cell can demonstrate cycling data that shows an improvement in $CO_2$ uptake by poly(5-cyano-2,3-diphenylnaphthoquinone) in the presence of 100 mM of phenol dissolved in the BMIM TFSI electrolyte.

Example 7

A pressure-sealed cell can demonstrate cycling data that shows an improvement in $CO_2$ uptake by poly(5-cyano-2,3-diphenylnaphthoquinone) in the presence of 1M of phenol dissolved in the BMIM TFSI electrolyte.

Example 8

A pressure-sealed cell can demonstrate cycling data that shows an improvement in $CO_2$ uptake by poly(5-cyano-2,3-diphenylnaphthoquinone) in the presence of 100 mM of 4-fluorophenol dissolved in the BMIM TFSI electrolyte.

Example 9

Figure 12:
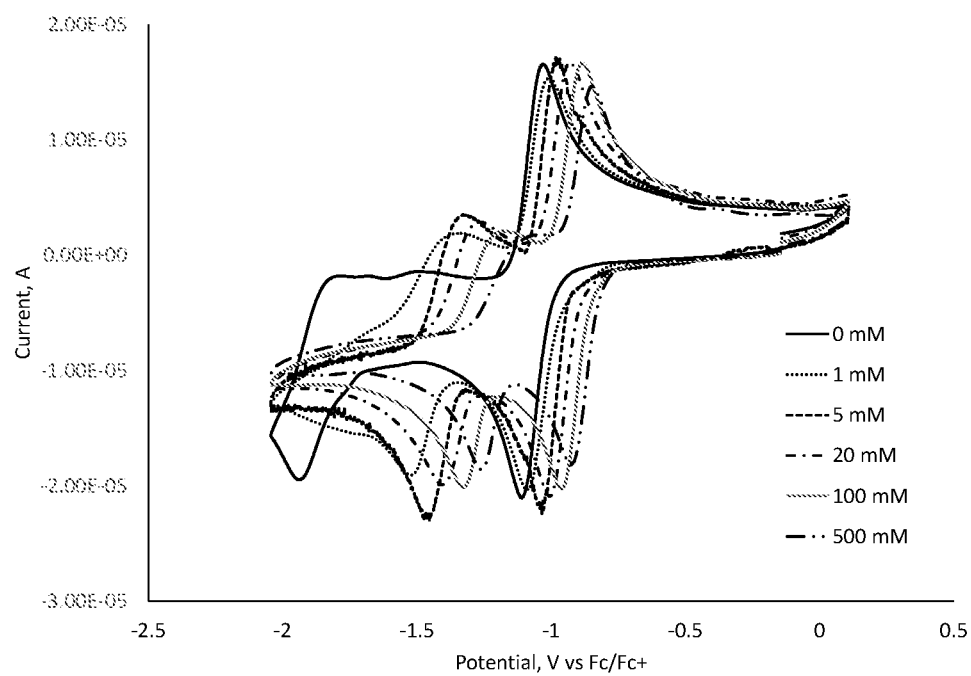
FIG. 12 is a graph of current (A) versus potential (V vs. $Fc/Fc^+$) and shows overlaid cyclic voltammograms as described in Example 9.

FIG. 12 shows the overlaid CV data of phenanthrenequinone (1 mM), 100 mM of tetrabutylammonium hexafluorophosphate supporting electrolyte, in the presence of varying concentrations of the hydrogen bond donor additive 1,3-diphenylurea under an inert atmosphere of nitrogen in DMF. Both the first redox couple couple corresponding to the quinone reduction to the semiquinone (−1.1 V) and the second reduction of the semiquinone to the dianion (−1.9 V) are sensitive to diphenylurea, as indicated by the positive shifts in potential for both redox couples. This demonstrates that the products formed are hydrogen bonded, stabilized reduced species.

Figure 13:
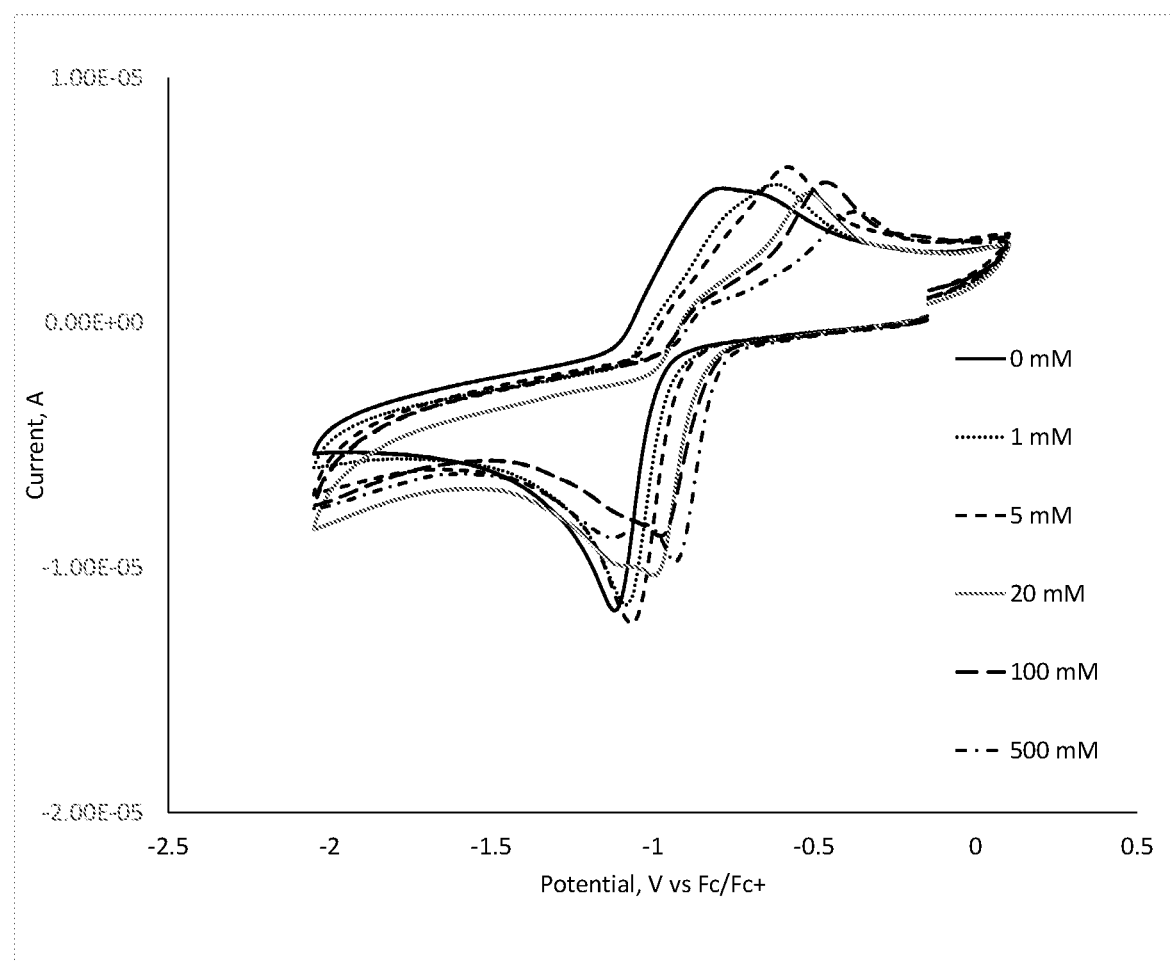
FIG. 13 is a graph of current (A) versus potential (V vs. $Fc/Fc^+$) and shows overlaid cyclic voltammograms as described in Example 9.

FIG. 13 shows the overlaid CV data for phenanthrenequinone (1 millimolar, mM) in the presence of varying concentrations of the hydrogen bond donor additive 1,3-diphenylurea in $CO_2$-saturated DMF and 100 mM of tetrabutylammonium hexafluorophosphate supporting electrolyte. The additive causes a positive shift in the reduction/capture peak (from −1.1 V to −0.9 V), and in the release peak (from −0.8 V to −0.4 V). This demonstrated that the addition of the hydrogen bonding additive 1,3-diphenylurea leads to a positive shift in reduction potential demonstrating that the product formed is a hydrogen-bond stabilized $CO_2$ bound species rather than an unbound reduced species.

Example 10

Figure 14:
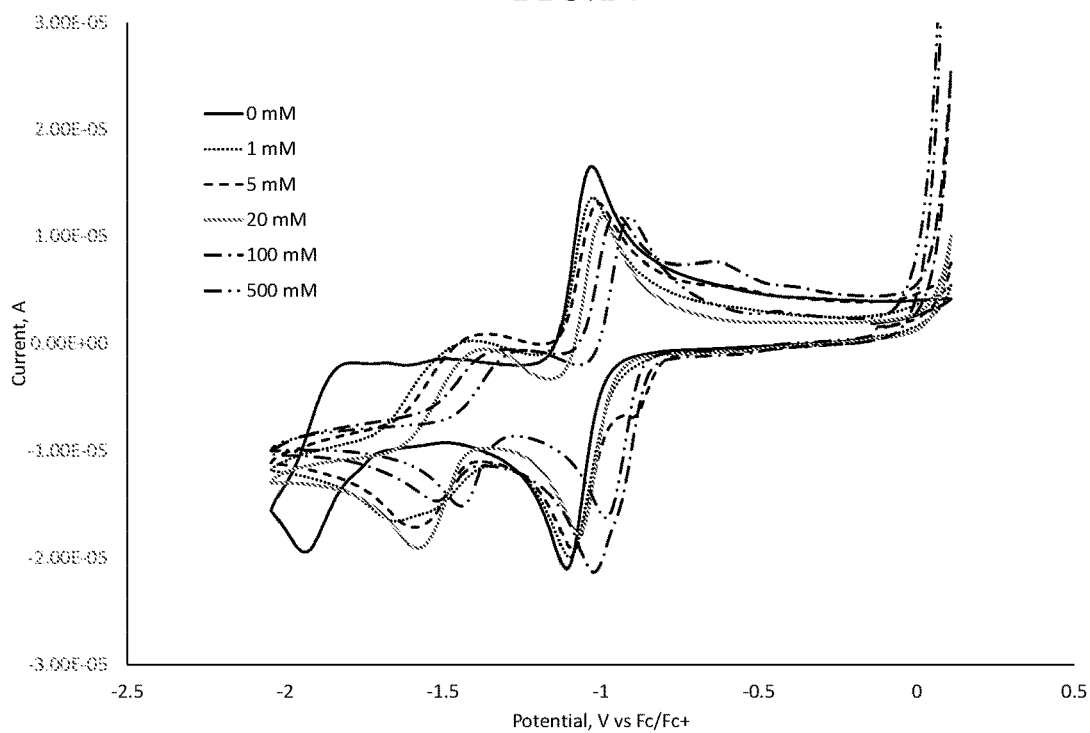
FIG. 14 is a graph of current (A) versus potential (V vs. $Fc/Fc^+$) and shows overlaid cyclic voltammograms as described in Example 10.

FIG. 14 shows the overlaid CV data of phenanthrenequinone (1 mM), 100 mM of tetrabutylammonium hexafluorophosphate supporting electrolyte, in the presence of varying concentrations of the hydrogen bond donor additive 1,3-diphenylguanidine under an inert atmosphere of nitrogen in DMF. Both the first redox couple couple corresponding to the quinone reduction to the semiquinone (−1.1 V) and the second reduction of the semiquinone to the dianion (−1.9 V) are sensitive to diphenylurea, as indicated by the positive shifts in potential for both redox couples. This demonstrates that the products formed are hydrogen bonded, stabilized reduced species.

Figure 15:
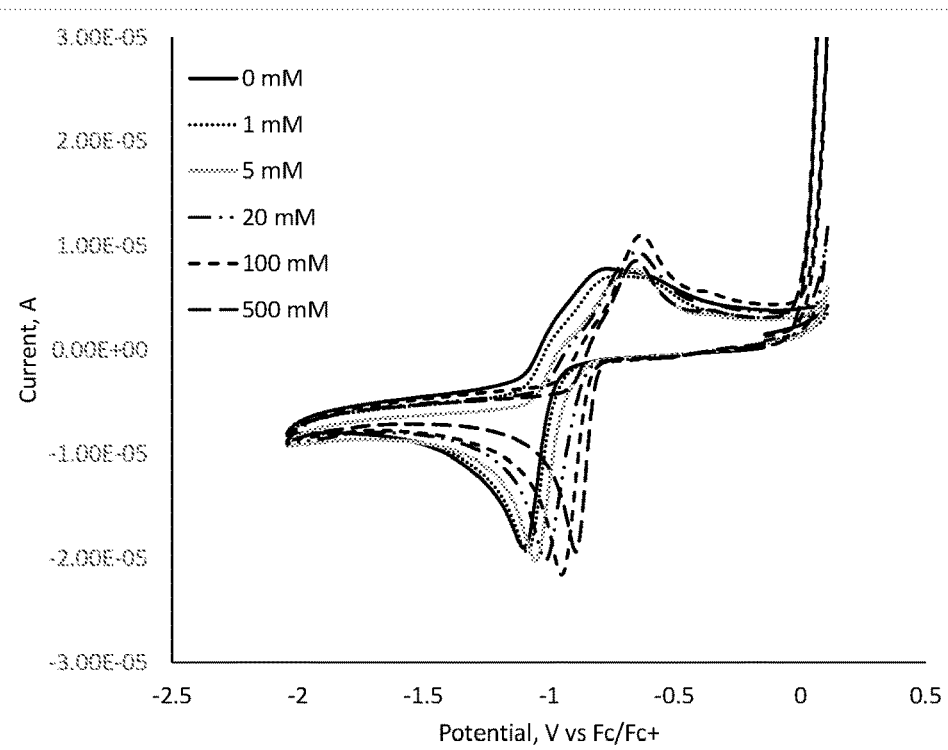
FIG. 15 is a graph of current (A) versus potential (V vs. $Fc/Fc^+$) and shows overlaid cyclic voltammograms as described in Example 10.

FIG. 15 shows the overlaid (CV) data for phenanthrenequinone (1 millimolar, mM) in the presence of varying concentrations of the hydrogen bond donor additive 1,3-diphenylguanidine in $CO_2$-saturated DMF and 100 mM of tetrabutylammonium hexafluorophosphate supporting electrolyte. The additive causes a positive shift in the reduction/capture peak (from −1.1 V to −0.9 V), and in the release peak (from −0.8 V to −0.6 V). This demonstrated that the addition of the hydrogen bonding additive 1,3-diphenylguanidine leads to a positive shift in reduction potential demonstrating that the product formed is a hydrogen-bond stabilized $CO_2$ bound species rather than an unbound reduced species.

Example 11

Figure 16:
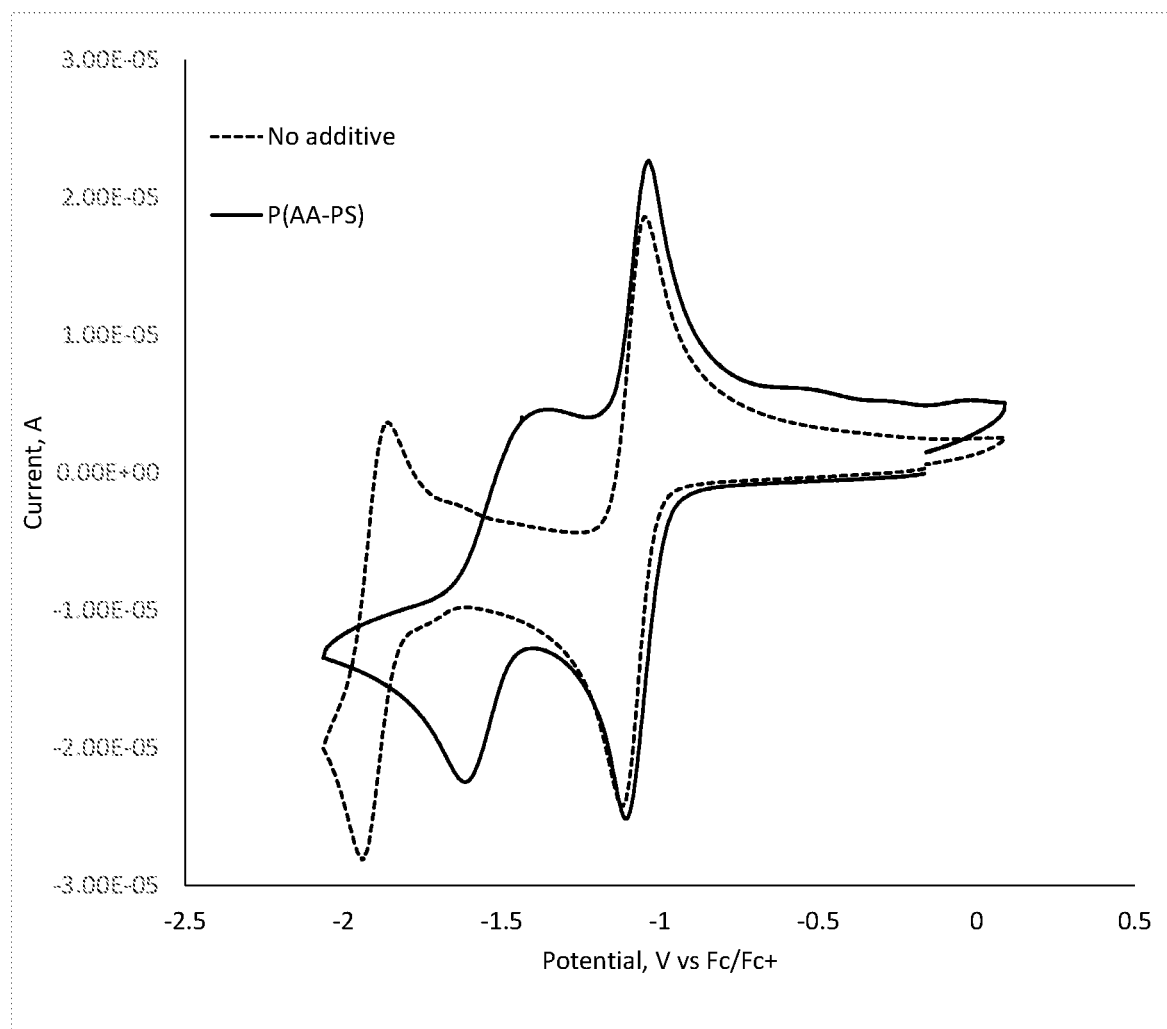
FIG. 16 is a graph of current (A) versus potential (V vs. $Fc/Fc^+$) and shows overlaid cyclic voltammograms as described in Example 11.

FIG. 16 shows the overlaid CV data of 1,4-naphthoquinone (1 mM), 100 mM of tetrabutylammonium hexafluorophosphate supporting electrolyte, with (solid trace) and without (dashed trace) the polymeric hydrogen bond donor additive poly(styrene-co-allyl alcohol) copolymer (100 mg/mL) under an inert atmosphere of nitrogen in DMF. The second redox couple corresponding to the semiquinone/dianion redox couple is sensitive to polymeric alcohol, as indicated by the positive shifts in potential from −1.9 V (dashed trace) to −1.6 V (solid trace). This demonstrates that the product formed is a hydrogen-bond stabilized species.

Figure 17:
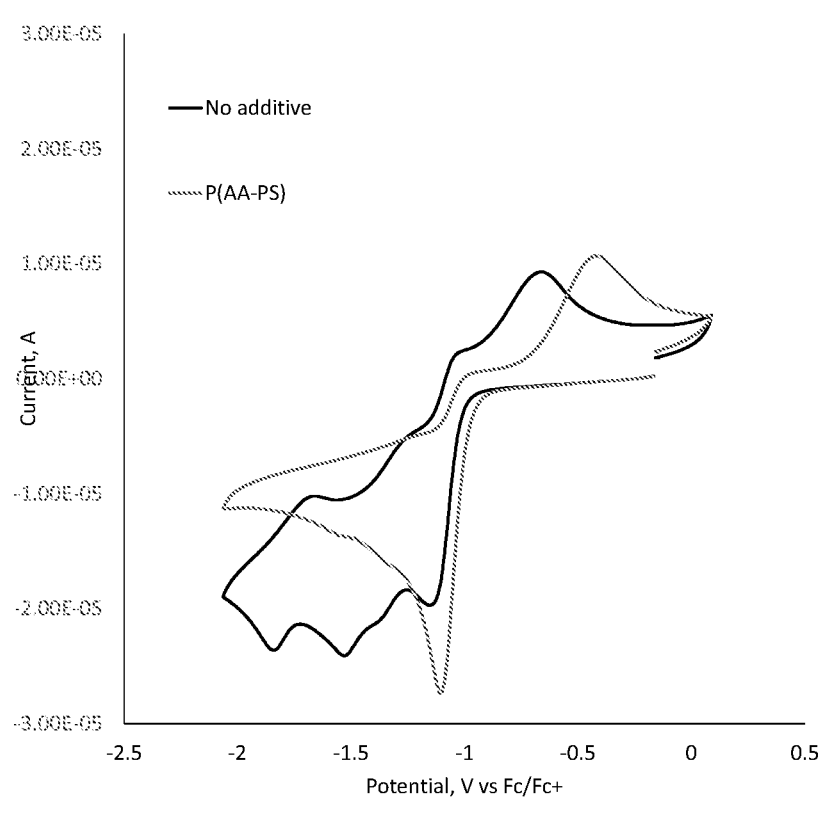
FIG. 17 is a graph of current (A) versus potential (V vs. $Fc/Fc^+$) and shows overlaid cyclic voltammograms as described in Example 11.

FIG. 17 shows the overlaid CV data of 1,4-naphthoquinone (1 mM), 100 mM of tetrabutylammonium hexafluorophosphate supporting electrolyte, with (grey trace) and without (black trace) the polymeric hydrogen bond donor additive poly(styrene-co-allyl alcohol) copolymer (100 mg/mL) in $CO_2$-saturated DMF. The additive causes the first and second reduction peaks to coalesce, as well as a positive shift in the $CO_2$ adduct oxidation (release) peak from −0.6 V (black trace) to −0.4 V (grey trace) demonstrating that the product formed is a hydrogen-bond stabilized $CO_2$ bound species rather than an unbound reduced species.

Example 12

Figure 18:
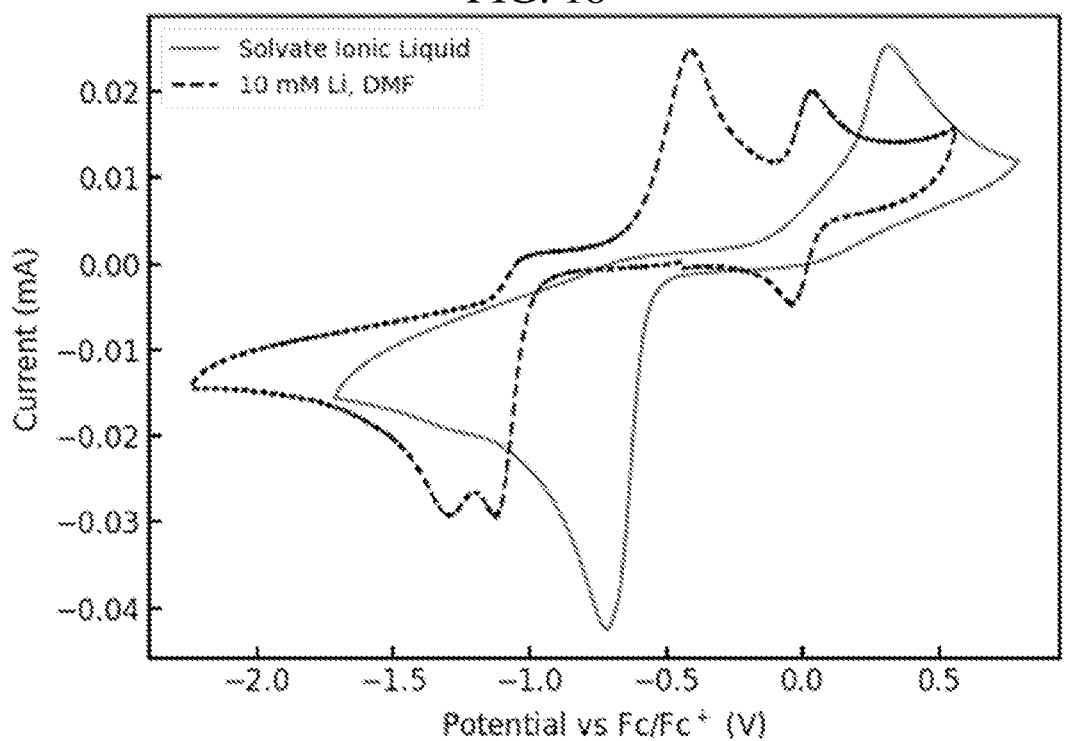
FIG. 18 is a graph of current (A) versus potential (V vs. $Fc/Fc^+$) and shows overlaid cyclic voltammograms as described in Example 12.

FIG. 18 shows the overlaid CV data of 1,4-naphthoquinone (28 mM) in a $CO_2$-saturated solvate ionic liquid electrolyte comprising tetraglyme with LiTFSI as the salt and the cationic Lewis acid stabilizing additive (solid trace). FIG. 18 also shows 1,4-naphthoquinone (1 mM), ferrocene (1 mM), LiTFSI (10 mM), and 100 mM of tetrabutylammonium hexafluorophosphate supporting electrolyte in $CO_2$-saturated DMF (dashed trace). FIG. 18 shows that use of the solvate ionic liquid as the electrolyte can provide an anodic shift in reduction potential of naphthoquinone and in increase in the potential difference between $CO_2$ capture and release peaks demonstrating that the product that is formed in the presence of the solvate ionic liquid provides a further stabilized $CO_2$ bound species and illustrates the onset of $CO_2$ capture at significantly milder applied potentials.

Example 13

Figure 19:
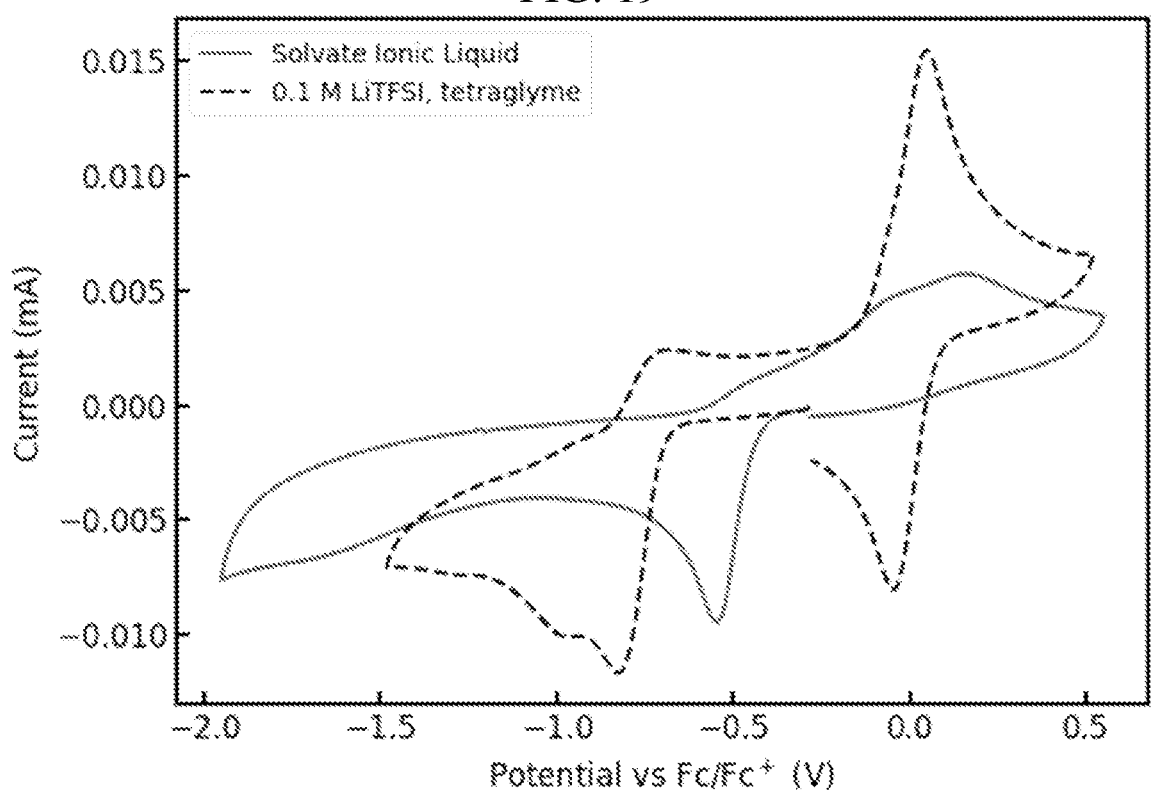
FIG. 19 graph of current (A) versus potential (V vs. $Fc/Fc^+$) and shows overlaid cyclic voltammograms as described in Example 13.

FIG. 19 shows the overlaid CV data of 2,3-dichloronaphthoquinone (6 mM) in a $CO_2$-saturated solvate ionic liquid electrolyte comprising tetraglyme with LiTFSI as the salt and the cationic Lewis acid stabilizing additive (solid trace). FIG. 19 also shows 2,3-dichloronaphthoquinone (1 mM), ferrocene (1 mM), and 100 mM of LiTFSI supporting electrolyte in $CO_2$-saturated tetraglyme (dashed trace). FIG. 19 shows that use of the solvate ionic liquid as the electrolyte can provide an anodic shift in reduction potential of 2,3-dichloronaphthoquinone and in increase in the potential difference between $CO_2$ capture and release peaks demonstrating that the product that is formed in the presence of the solvate ionic liquid provides a further stabilized $CO_2$ bound species and illustrates the onset of $CO_2$ capture at significantly milder applied potentials.

This disclosure further encompasses the following aspects.

Aspect 1. A method for separating a Lewis acid gas from a fluid mixture comprising the Lewis acid gas, the method comprising: contacting the fluid mixture with: an electroactive species in a reduced state; a non-aqueous electrolyte; and a stabilizing additive, to form an anion adduct between the Lewis acid gas and the electroactive species in the reduced state, wherein the electroactive species comprises: an oxidized state, and at least one reduced state wherein the electroactive species bonds with the Lewis acid gas to form the anion adduct, wherein the stabilizing additive comprises a cationic Lewis acid, a hydrogen-bond donor, or a combination thereof, and wherein the stabilizing additive is present in an effective amount to kinetically favor the forming of the anion adduct from the reduced electroactive species and the Lewis acid gas, thermodynamically favor the forming of the anion adduct in a thermodynamic equilibrium between the anion adduct and the reduced electroactive species, or kinetically favor the forming of the anion adduct from the reduced electroactive species and thermodynamically favor the forming of the anion adduct in the thermodynamic equilibrium between the anion adduct and the reduced electroactive species.

Aspect 2. The method of Aspect 1, wherein the stabilizing additive is not a supporting electrolyte.

Aspect 3. The method of Aspect 1 or 2, wherein at least a portion of the non-aqueous electrolyte is the stabilizing additive.

Aspect 4. The method of any one of Aspects 1 to 3, wherein an association constant between the reduced electroactive species and the Lewis acid gas in the presence of the effective amount of the stabilizing additive is greater than an association constant between the reduced electroactive species and the Lewis acid gas in the absence of the effective amount of the stabilizing additive.

Aspect 5. The method of any one of Aspects 1 to 4, wherein the forming of the anion adduct from the reduced electroactive species and the Lewis acid gas in the presence of the effective amount of the stabilizing additive is kinetically more favorable than forming an anion adduct from the reduced electroactive species and the Lewis acid gas in the absence of the effective amount of the stabilizing additive.

Aspect 6. The method of any one of Aspects 1 to 5, wherein the electroactive species comprises an electroactive polymer, an electroactive oligomer, an electroactive organic compound, an electroactive inorganic complex, an electroactive organometallic complex, or a combination thereof.

Aspect 7. The method of any one of Aspects 1 to 6, wherein the electroactive species comprises: a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted alloxazine, a substituted or unsubstituted isoalloxazine, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquinonone, a substituted or unsubstituted disulfide, or a combination thereof, preferably, a substituted or unsubstituted 1,4-benzoquinone, a substituted or unsubstituted 1,2-benzoquinone, a substituted or unsubstituted 1,4-naphthoquinone, a substituted or unsubstituted 1,2-naphthoquinone, a substituted or unsubstituted 2,3-diaminonaphthalene, a substituted or unsubstituted anthraquinone, a substituted or unsubstituted phenanthrenequinone, a substituted or unsubstituted benzanthraquinone, a substituted or unsubstituted dibenzoanthraquinone, a substituted or unsubstituted 4,5,9,10-pyrenetetrone, a substituted or unsubstituted indole, a substituted or unsubstituted quinoline, a substituted or unsubstituted isoquinoline, a substituted or unsubstituted benzimidazole, a substituted or unsubstituted benzotriazole, or a combination thereof; or a polymer or oligomer comprising a repeating unit derived from a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquinonone, a substituted or unsubstituted disulfide, or a combination thereof; preferably, a polymer or oligomer comprising a repeating unit derived from a substituted or unsubstituted 1,4-benzoquinone, a substituted or unsubstituted 1,2-benzoquinone, a substituted or unsubstituted 1,4-naphthoquinone, a substituted or unsubstituted 1,2-naphthoquinone, a substituted or unsubstituted 2,3-diaminonaphthalene, a substituted or unsubstituted anthraquinone, a substituted or unsubstituted phenanthrenequinone, a substituted or unsubstituted benzanthraquinone, a substituted or unsubstituted dibenzoanthraquinone, a substituted or unsubstituted 4,5,9,10-pyrenetetrone, a substituted or unsubstituted indole, a substituted or unsubstituted quinoline, a substituted or unsubstituted isoquinoline, a substituted or unsubstituted benzimidazole, a substituted or unsubstituted benzotriazole, or a combination thereof.

Aspect 8. The method of any one of Aspects 1 to 7, wherein the Lewis acid gas is $CO_2$, COS, SO, $SO_3$, $R_2SO_4$, $NO_2$, $NO_3$, $R_3PO_4$, $R_2S$, RCOOR', RCHO, $R'_2CO$, R'NCO, R'NCS, $BR''_3$, $R''_3BO_3$, or a combination thereof, wherein each R is independently hydrogen, $C_{1-12}$ alkyl, $C_{3-12}$ cycloalkyl, $C_{1-12}$ heterocycloalkyl, $C_{6-20}$ aryl, or $C_{1-12}$ heteroaryl; each R' is independently $C_{1-12}$ alkyl, $C_{3-12}$ cycloalkyl, $C_{1-12}$ heterocycloalkyl, $C_{6-20}$ aryl, or $C_{1-12}$ heteroaryl; and each R" is independently hydrogen, halogen, $C_{1-12}$ alkyl, $C_{3-12}$ cycloalkyl, $C_{1-12}$ heterocycloalkyl, $C_{6-20}$ aryl, or $C_{1-12}$ heteroaryl.

Aspect 9. The method of any one of Aspects 1 to 8, wherein the non-aqueous electrolyte comprises an organic electrolyte, an ionic liquid, a solvate ionic liquid, or a combination thereof, wherein the organic electrolyte comprises an organic solvent and a supporting electrolyte, preferably wherein the organic solvent is acetonitrile, dimethylformamide, propylene carbonate, dimethylsulfoxide, polyethylene glycol, diglyme, triethylene glycol dimethyl ether (trigylyme), tetraethylene glycol dimethyl ether (tetraglyme), pentaethylene glycol dimethyl ether (pentaglyme), 18-crown-6 ether, or a combination thereof.

Aspect 10. The method of any one of Aspects 1 to 9, wherein the non-aqueous electrolyte comprises an ionic liquid, preferably wherein an ionic liquid cation is unsubstituted or substituted imidazolium, unsubstituted or substituted morpholinium, unsubstituted or substituted pyridinium, unsubstituted or substituted pyrrolidinium, unsubstituted or substituted piperidinium, unsubstituted or substituted piperazinium, unsubstituted or substituted pyrazinium, or a combination thereof, more preferably wherein the ionic liquid is 1-ethyl-3-methylimidazolium bis(trifluoromethanesulfonyl)imide, 1-ethyl-3-methylimidazolium bis(fluorosulfonyl)imide, 1-ethyl-3-methylimidazolium bis(pentafluorosulfonyl)imide, 1-ethyl-3-methylimidazolium dicyanamide, 1-ethyl-3-methylimidazolium tetrafluoroborate, 1-butyl-3-methylimidazolium bis(trifluoromethyl-sulfonyl)imide, 1-butyl-3-methylpyridinium bis (trifluoromethyl-sulfonyl)imide, N-methyl-N-propylpiperidinium bis(trifluoromethanesulfonyl)imide, or a combination thereof.

Aspect 11. The method of any one of aspects 1 to 10, wherein the non-aqueous electrolyte comprises a solvate ionic liquid comprising a chelating solvent and a salt, preferably, wherein the chelating solvent comprises triethylene glycol dimethyl ether, tetraethylene glycol dimethyl ether, pentaethylene glycol dimethyl ether, 18-crown-6 ether, or a combination thereof; and wherein the salt comprises an alkali metal salt, an alkaline earth metal salt, or a combination thereof.

Aspect 12. The method of any one of Aspects 1 to 11, wherein the electroactive species comprises a quinone-containing compound that is a substituted or unsubstituted quinone or tetrone, a polymer or oligomer comprising repeating units derived from a substituted or unsubstituted quinone or tetrone, or a combination thereof, wherein the anion adduct is formed between a semiquinone anion or a quinone dianion and the Lewis acid gas.

Aspect 13. The method of any one of Aspects 1 to 12, wherein the stabilizing additive is the cationic Lewis acid, and the anion adduct formed between the semiquinone anion or the quinone dianion and the Lewis acid gas is thermodynamically more stable than an anion adduct formed between the semiquinone anion or the quinone dianion and the cationic Lewis acid.

Aspect 14. The method of any one of Aspects 1 to 13, wherein a reaction equilibrium constant between the semiquinone anion or the quinone dianion and the Lewis acid gas in the presence of the cationic Lewis acid is greater than a reaction equilibrium constant between the semiquinone anion or the quinone dianion and the Lewis acid gas in the absence of the cationic Lewis acid.

Aspect 15. The method of any one of Aspects 1 to 14, wherein an ionic bond strength between the cationic Lewis acid and the anion adduct is greater than an ionic bond strength between the semiquinone anion or the quinone dianion and the cationic Lewis acid.

Aspect 16. The method of any one of Aspects 1 to 15, wherein an association constant between the cationic Lewis acid and the anion adduct is greater than an association constant between the semiquinone anion or the quinone dianion and the cationic Lewis acid.

Aspect 17. The method of any one of Aspects 1 to 16, wherein an association constant between the semiquinone anion or the quinone dianion and the Lewis acid gas in the presence of the effective amount of the cationic Lewis acid is greater than an association constant between the semiquinone anion or the quinone dianion and the Lewis acid gas in the absence of the effective amount of the cationic Lewis acid.

Aspect 18. The method of any one of Aspects 1 to 17, wherein the forming of the anion adduct from the reduced electroactive species and the Lewis acid gas in the presence of the effective amount of the cationic Lewis acid is more kinetically favorable than the forming of the anion adduct from the reduced electroactive species and the Lewis acid gas in the absence of the effective amount of the cationic Lewis acid.

Aspect 19. The method of any one of Aspects 1 to 18, wherein the cationic Lewis acid comprises a metal cation, preferably wherein the metal cation is a Group 1 element, a Group 2 element, a rare earth element, a Group 11 element, a Group 12 element, a Group 13 element, or a combination thereof; more preferably wherein the metal cation is Li, Na, K, Mg, Ca, Sc, La, Al, Zn, or a combination thereof.

Aspect 20. The method of any of aspects 1 to 19, wherein the non-aqueous electrolyte comprises a solvate ionic liquid comprising a chelating solvent and a salt, wherein the salt comprises the metal cation of the cationic Lewis acid.

Aspect 21. The method of any one of Aspects 1 to 20, wherein the stabilizing additive comprises the hydrogen-bond donor, preferably wherein a hydrogen-bond strength between a hydrogen atom of the hydrogen-bond donor and the anion adduct is greater than a hydrogen-bond strength between the hydrogen atom of the hydrogen-bond donor and the semiquinone anion or the quinone dianion.

Aspect 22. The method of any one of Aspects 1 to 21, wherein the stabilizing additive is the hydrogen-bond donor, and the anion adduct between the semiquinone anion or the quinone dianion and the Lewis acid gas is thermodynamically more stable than an adduct formed between the semiquinone anion or the quinone dianion and the hydrogen-bond donor.

Aspect 23. The method of any one of Aspects 1 to 22, wherein the stabilizing additive is the hydrogen-bond donor, and a reaction equilibrium constant between the semiquinone anion or the quinone dianion and the Lewis acid gas in the presence of the hydrogen-bond donor is greater than a reaction equilibrium constant between the semiquinone anion or the quinone dianion and the Lewis acid gas in the absence of the hydrogen-bond donor.

Aspect 24. The method of any one of Aspects 1 to 23, wherein the stabilizing additive is the hydrogen-bond donor, and an association constant between the hydrogen-bond donor and the anion adduct is greater than an association constant between the semiquinone anion or the quinone dianion and the hydrogen-bond donor.

Aspect 25. The method of any one of Aspects 1 to 24, wherein the stabilizing additive is the hydrogen-bond donor, and an association constant between the semiquinone anion or the quinone dianion and the Lewis acid gas in the presence of the effective amount of the hydrogen bond donor is greater than an association constant between the semiquinone anion or the quinone dianion and the Lewis acid gas in the absence of the effective amount of the hydrogen bond donor.

Aspect 26. The method of any one of Aspects 1 to 25, wherein the forming of the anion adduct from the reduced electroactive species and the Lewis acid gas in the presence of the effective amount of the hydrogen bond donor is more kinetically favorable than the forming of the anion adduct from the reduced electroactive species and the Lewis acid gas in the absence of the effective amount of the hydrogen bond donor.

Aspect 27. The method of any one of Aspects 1 to 26, wherein the hydrogen bond donor comprises a hydroxyl group, an ammonium group, an anilinium group, a pyridinium group, an imidazolium group, a carboxylic acid group, a thiol group, a urea group, a guanidine group, a thiourea group, or a combination thereof; preferably wherein the hydrogen bond donor has a phenolic hydroxyl group or is water.

Aspect 28. The method of any one of Aspects 1 to 27, wherein the hydrogen bond donor has more than one hydrogen bonding group which can bind to the reduced electroactive species and the Lewis acid gas by more than one binding mode.

Aspect 29. The method of any one of Aspects 1 to 28, wherein the hydrogen bond donor is a polymeric compound comprising one or more of a hydroxyl group, an ammonium group, an anilinium group, a pyridinium group, an imidazolium group, a carboxylic acid group, a thiol group, a urea group, a guanidine group, a thiourea group, or a combination thereof.

Aspect 30. An electrochemical apparatus comprising: a chamber comprising a negative electrode in electronic communication with an electroactive species in a reduced state, a non-aqueous electrolyte, and a stabilizing additive, wherein the chamber is configured to receive a fluid mixture comprising a Lewis acid gas, wherein the electroactive species comprises: an oxidized state, and at least one reduced state wherein the electroactive species bonds with the Lewis acid gas to form an anion adduct, wherein the stabilizing additive comprises a cationic Lewis acid, a hydrogen-bond donor, or a combination thereof, and wherein the stabilizing additive is present in an effective amount to: kinetically favor the forming of an anion adduct between the Lewis acid gas and the reduced electroactive species, thermodynamically favor the forming of the anion adduct in a thermodynamic equilibrium between the anion adduct and the reduced electroactive species, or kinetically favor the forming of the anion adduct between the Lewis acid gas and the reduced electroactive species and thermodynamically favor the forming of the anion adduct in the thermodynamic equilibrium between the anion adduct and the reduced electroactive species.

Aspect 31. A gas separation system, comprising a plurality of electrochemical cells in fluid communication with a gas inlet and a gas outlet, wherein each of the plurality of electrochemical cells comprises: a first electrode comprising an electroactive species in a reduced state, wherein the electroactive species comprises an oxidized state and at least one reduced state which bonds with the Lewis acid gas to form the anion adduct; a second electrode comprising a complementary electroactive layer; a first separator between the first electrode and the second electrode; a non-aqueous electrolyte; and a stabilizing additive, wherein the stabilizing additive comprises a cationic Lewis acid, a hydrogen-bond donor, or a combination thereof, wherein the stabilizing additive is present in an effective amount to: kinetically favor the forming of the anion adduct from the reduced electroactive species and the Lewis acid gas, thermodynamically favor the forming of the anion adduct in a thermodynamic equilibrium between the anion adduct and the reduced electroactive species, or kinetically favor the forming of the anion adduct from the reduced electroactive species and thermodynamically favor the forming of the anion adduct in the thermodynamic equilibrium between the anion adduct and the reduced electroactive species.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl," whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene"

means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(═O)$_2$-alkyl), a $C_{6-12}$ aryl sulfonyl (—S(═O)$_2$-aryl), a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, a $C_{3-12}$ heteroaryl, a halogen, a carbonyl (—C(═O)OH), a $C_{1-6}$ alkyl ester (—C(═O)O-alkyl), or a $C_{1-6}$ alkyl amide (—C(═O)N(alkyl)$_2$) instead of hydrogen, provided that the substituted atom's normal valence is not exceeded. The number of carbon atoms indicated in a group is exclusive of any substituents. For example —$CH_2CH_2CN$ includes a $C_2$ alkyl group (—$CH_2CH_3$) substituted with a nitrile (—CN).

While particular aspects have been described, alternatives, modifications, variations, improvements, and substantial equivalents that are or may be presently unforeseen may arise to the inventors or others skilled in the art. Accordingly, the appended claims as filed and as they may be amended are intended to embrace all such alternatives, modifications variations, improvements, and substantial equivalents.

What is claimed is:

1. A method for separating a Lewis acid gas from a fluid mixture comprising the Lewis acid gas, the method comprising:
    contacting the fluid mixture with:
        an electroactive species in a reduced state;
        a non-aqueous electrolyte; and
        a stabilizing additive,
    to form an anion adduct between the Lewis acid gas and the electroactive species in the reduced state,
        wherein the electroactive species comprises:
            an oxidized state, and
            at least one reduced state wherein the electroactive species bonds with the Lewis acid gas to form the anion adduct,
        wherein the stabilizing additive comprises a cationic Lewis acid, a hydrogen-bond donor, or a combination thereof, and
        wherein the stabilizing additive is present in an effective amount to
            kinetically favor the forming of the anion adduct from the reduced electroactive species and the Lewis acid gas,
            thermodynamically favor the forming of the anion adduct in a thermodynamic equilibrium between the anion adduct and the reduced electroactive species, or
            kinetically favor the forming of the anion adduct from the reduced electroactive species and thermodynamically favor the forming of the anion adduct in the thermodynamic equilibrium between the anion adduct and the reduced electroactive species.

2. The method of claim 1, wherein the stabilizing additive is not a supporting electrolyte.

3. The method of claim 1, wherein at least a portion of the non-aqueous electrolyte is the stabilizing additive.

4. The method of claim 1, wherein an association constant between the reduced electroactive species and the Lewis acid gas in the presence of the effective amount of the stabilizing additive is greater than an association constant between the reduced electroactive species and the Lewis acid gas in the absence of the effective amount of the stabilizing additive.

5. The method of claim 1, wherein the forming of the anion adduct from the reduced electroactive species and the Lewis acid gas in the presence of the effective amount of the stabilizing additive is kinetically more favorable than forming an anion adduct from the reduced electroactive species and the Lewis acid gas in the absence of the effective amount of the stabilizing additive.

6. The method of claim 1, wherein the electroactive species comprises an electroactive polymer, an electroactive oligomer, an electroactive organic compound, an electroactive inorganic complex, an electroactive organometallic complex, or a combination thereof.

7. The method of claim 1, wherein the electroactive species comprises:
    a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted alloxazine, a substituted or unsubstituted isoalloxazine, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquinone, a substituted or unsubstituted disulfide, or a combination thereof;
    or
    a polymer or oligomer comprising a repeating unit derived from a substituted or unsubstituted quinone, a substituted or unsubstituted tetrone, a substituted or unsubstituted bipyridinium, a substituted or unsubstituted bipyridine, a substituted or unsubstituted phenazine, a substituted or unsubstituted benzimidazole, a substituted or unsubstituted benzotriazole, a substituted or unsubstituted indole, a substituted or unsubstituted viologen, a substituted or unsubstituted pyrazinium, a substituted or unsubstituted pyrimidinium, a substituted or unsubstituted quinoline, a substituted or unsubstituted isoquinoline, a substituted or unsubstituted quinoxalinium, a substituted or unsubstituted pyrylium, a substituted or unsubstituted pyrazine, a substituted or unsubstituted pyridinium, a substituted or unsubstituted tetrazolium, a substituted or unsubstituted verdazyl, a substituted or unsubstituted quinodimethane, a substituted or unsubstituted tricyanovinylbenzene, a substituted or unsubstituted tetracyanoethylene, a substituted or unsubstituted thioketone, a substituted or unsubstituted thioquionone, a substituted or unsubstituted disulfide, or a combination thereof.

8. The method of claim 1, wherein
the Lewis acid gas is $CO_2$, COS, $SO_2$, $SO_3$, $R_2SO_4$, $NO_2$, $NO_3$, $R_3PO_4$, $R_2S$, RCOOR', RCHO, $R'_2CO$, R'NCO, R'NCS, $BR''_3$, $R''_3BO_3$, or a combination thereof, wherein
each R is independently hydrogen, $C_{1-12}$ alkyl, $C_{3-12}$ cycloalkyl, $C_{1-12}$ heterocycloalkyl, $C_{6-20}$ aryl, or $C_{1-12}$ heteroaryl;
each R' is independently $C_{1-12}$ alkyl, $C_{3-12}$ cycloalkyl, $C_{1-12}$ heterocycloalkyl, $C_{6-20}$ aryl, or $C_{1-12}$ heteroaryl; and
each R" is independently hydrogen, halogen, $C_{1-12}$ alkyl, $C_{3-12}$ cycloalkyl, $C_{1-12}$ heterocycloalkyl, $C_{6-20}$ aryl, or $C_{1-12}$ heteroaryl.

9. The method of claim 1, wherein the non-aqueous electrolyte comprises an organic electrolyte, an ionic liquid, a solvate ionic liquid, or a combination thereof,
wherein the organic electrolyte comprises an organic solvent and a supporting electrolyte.

10. The method of claim 1, wherein the non-aqueous electrolyte comprises an ionic liquid.

11. The method of claim 1, wherein the non-aqueous electrolyte comprises a solvate ionic liquid comprising a chelating solvent and a salt.

12. The method of claim 1, wherein the electroactive species comprises a quinone-containing compound that is a substituted or unsubstituted quinone or tetrone, a polymer or oligomer comprising repeating units derived from a substituted or unsubstituted quinone or tetrone, or a combination thereof,
wherein the anion adduct is formed between a semiquinone anion or a quinone dianion and the Lewis acid gas.

13. The method of claim 12, wherein the stabilizing additive is the cationic Lewis acid, and the anion adduct formed between the semiquinone anion or the quinone dianion and the Lewis acid gas is thermodynamically more stable than an anion adduct formed between the semiquinone anion or the quinone dianion and the cationic Lewis acid.

14. The method of claim 12, wherein a reaction equilibrium constant between the semiquinone anion or the quinone dianion and the Lewis acid gas in the presence of the cationic Lewis acid is greater than a reaction equilibrium constant between the semiquinone anion or the quinone dianion and the Lewis acid gas in the absence of the cationic Lewis acid.

15. The method of claim 12, wherein an ionic bond strength between the cationic Lewis acid and the anion adduct is greater than an ionic bond strength between the semiquinone anion or the quinone dianion and the cationic Lewis acid.

16. The method of claim 12, wherein an association constant between the cationic Lewis acid and the anion adduct is greater than an association constant between the semiquinone anion or the quinone dianion and the cationic Lewis acid.

17. The method of claim 12, wherein an association constant between the semiquinone anion or the quinone dianion and the Lewis acid gas in the presence of the effective amount of the cationic Lewis acid is greater than an association constant between the semiquinone anion or the quinone dianion and the Lewis acid gas in the absence of the effective amount of the cationic Lewis acid.

18. The method of claim 1, wherein the forming of the anion adduct from the reduced electroactive species and the Lewis acid gas in the presence of the effective amount of the cationic Lewis acid is more kinetically favorable than the forming of the anion adduct from the reduced electroactive species and the Lewis acid gas in the absence of the effective amount of the cationic Lewis acid.

19. The method of claim 1, wherein the cationic Lewis acid comprises a metal cation.

20. The method of claim 19, wherein the non-aqueous electrolyte comprises a solvate ionic liquid comprising a chelating solvent and a salt, wherein the salt comprises the metal cation of the cationic Lewis acid.

21. The method of claim 1, wherein the stabilizing additive comprises the hydrogen-bond donor.

22. The method of claim 12, wherein the stabilizing additive is the hydrogen-bond donor, and the anion adduct between the semiquinone anion or the quinone dianion and the Lewis acid gas is thermodynamically more stable than an adduct formed between the semiquinone anion or the quinone dianion and the hydrogen-bond donor.

23. The method of claim 12, wherein the stabilizing additive is the hydrogen-bond donor, and a reaction equilibrium constant between the semiquinone anion or the quinone dianion and the Lewis acid gas in the presence of the hydrogen-bond donor is greater than a reaction equilibrium constant between the semiquinone anion or the quinone dianion and the Lewis acid gas in the absence of the hydrogen-bond donor.

24. The method of claim 12, wherein the stabilizing additive is the hydrogen-bond donor, and an association constant between the hydrogen-bond donor and the anion adduct is greater than an association constant between the semiquinone anion or the quinone dianion and the hydrogen-bond donor.

25. The method of claim 12, wherein the stabilizing additive is the hydrogen-bond donor, and an association constant between the semiquinone anion or the quinone dianion and the Lewis acid gas in the presence of the effective amount of the hydrogen bond donor is greater than an association constant between the semiquinone anion or the quinone dianion and the Lewis acid gas in the absence of the effective amount of the hydrogen bond donor.

26. The method of claim 1, wherein the forming of the anion adduct from the reduced electroactive species and the Lewis acid gas in the presence of the effective amount of the hydrogen bond donor is more kinetically favorable than the forming of the anion adduct from the reduced electroactive species and the Lewis acid gas in the absence of the effective amount of the hydrogen bond donor.

27. The method of claim 1, wherein the hydrogen bond donor comprises a hydroxyl group, an ammonium group, an anilinium group, a pyridinium group, an imidazolium group, a carboxylic acid group, a thiol group, a urea group, a guanidine group, a thiourea group, or a combination thereof.

28. The method of claim 1, wherein the hydrogen bond donor has more than one hydrogen bonding group which can bind to the reduced electroactive species and the Lewis acid gas by more than one binding mode.

29. The method of claim 1, wherein the hydrogen bond donor is a polymeric compound comprising one or more of a hydroxyl group, an ammonium group, an anilinium group, a pyridinium group, an imidazolium group, a carboxylic acid group, a thiol group, a urea group, a guanidine group, a thiourea group, or a combination thereof.

30. An electrochemical apparatus comprising:

a chamber comprising a negative electrode in electronic communication with an electroactive species in a reduced state, a non-aqueous electrolyte, and a stabilizing additive, wherein the chamber is configured to receive a fluid mixture comprising a Lewis acid gas, wherein the electroactive species comprises:
- an oxidized state, and
- at least one reduced state wherein the electroactive species bonds with the Lewis acid gas to form an anion adduct, wherein the stabilizing additive comprises a cationic Lewis acid, a hydrogen-bond donor, or a combination thereof, and wherein the stabilizing additive is present in an effective amount to:
- kinetically favor the forming of an anion adduct between the Lewis acid gas and the reduced electroactive species,
- thermodynamically favor the forming of the anion adduct in a thermodynamic equilibrium between the anion adduct and the reduced electroactive species, or
- kinetically favor the forming of the anion adduct between the Lewis acid gas and the reduced electroactive species and thermodynamically favor the forming of the anion adduct in the thermodynamic equilibrium between the anion adduct and the reduced electroactive species.

31. A gas separation system, comprising a plurality of electrochemical cells in fluid communication with a gas inlet and a gas outlet, wherein each of the plurality of electrochemical cells comprises:

a first electrode comprising an electroactive species in a reduced state, wherein the electroactive species comprises an oxidized state and at least one reduced state which bonds with the Lewis acid gas to form the anion adduct;

a second electrode comprising a complementary electroactive layer;

a first separator between the first electrode and the second electrode; and a non-aqueous electrolyte comprising a stabilizing additive, wherein the stabilizing additive comprises a cationic Lewis acid, a hydrogen-bond donor, or a combination thereof, wherein the stabilizing additive is present in an effective amount to:
- kinetically favor the forming of the anion adduct from the reduced electroactive species and the Lewis acid gas,
- thermodynamically favor the forming of the anion adduct in a thermodynamic equilibrium between the anion adduct and the reduced electroactive species, or
- kinetically favor the forming of the anion adduct from the reduced electroactive species and thermodynamically favor the forming of the anion adduct in the thermodynamic equilibrium between the anion adduct and the reduced electroactive species.

* * * * *